(12) United States Patent
Lee

(10) Patent No.: US 11,397,883 B2
(45) Date of Patent: Jul. 26, 2022

(54) FINGERPRINT SENSOR PACKAGE AND SMART CARD INCLUDING THE SAME

(71) Applicant: SAMSUNG ELECTRONICS CO., LTD., Suwon-si (KR)

(72) Inventor: Gwangjin Lee, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/212,549

(22) Filed: Mar. 25, 2021

(65) Prior Publication Data

US 2022/0027700 A1 Jan. 27, 2022

(30) Foreign Application Priority Data

Jul. 24, 2020 (KR) .................. 10-2020-0092542

(51) Int. Cl.
*G06K 19/07* (2006.01)
*G06V 40/13* (2022.01)

(52) U.S. Cl.
CPC ..... *G06K 19/0718* (2013.01); *G06V 40/1306* (2022.01)

(58) Field of Classification Search
CPC ............... G06K 19/0718; G06V 40/1306
USPC ........................................................ 235/451
See application file for complete search history.

(56) References Cited

U.S. PATENT DOCUMENTS

| | | | |
|---|---|---|---|
| 6,439,822 B1 | 8/2002 | Kimura et al. | |
| 7,251,351 B2 | 7/2007 | Mathiassen et al. | |
| 9,052,587 B2 | 6/2015 | Yamazaki et al. | |
| 9,928,400 B2 | 3/2018 | Ohsumi | |
| 10,242,243 B2 | 3/2019 | Kim et al. | |
| 10,402,712 B1* | 9/2019 | Cheng | G06K 19/07354 |
| 10,846,503 B2* | 11/2020 | Suwald | G06K 19/0718 |
| 2005/0050944 A1 | 3/2005 | Ha et al. | |
| 2010/0108865 A1 | 5/2010 | Cho et al. | |
| 2011/0315985 A1 | 12/2011 | Oba et al. | |
| 2014/0341448 A1 | 11/2014 | Chiu | |
| 2019/0213375 A1* | 7/2019 | Suwald | G06F 21/32 |
| 2020/0311509 A1* | 10/2020 | Benkley, III | G06F 21/32 |
| 2021/0049439 A1* | 2/2021 | Finn | G06K 19/07354 |

FOREIGN PATENT DOCUMENTS

| | | |
|---|---|---|
| KR | 10-0529233 | 11/2005 |
| KR | 10-0646906 | 11/2006 |
| KR | 10-1065077 | 9/2011 |
| KR | 10-1389784 | 4/2014 |
| KR | 10-2017-0021585 | 2/2017 |
| KR | 10-2018-0038971 | 4/2018 |
| KR | 10-1932778 | 12/2018 |

OTHER PUBLICATIONS

Ip.com.*

* cited by examiner

*Primary Examiner* — Allyson N Trail
(74) *Attorney, Agent, or Firm* — F. Chau & Associates, LLC

(57) ABSTRACT

A smart card including a fingerprint sensor package is provided. The fingerprint sensor package includes first sensing patterns, second sensing patterns, ground patterns, and a controller integrated circuit (IC). The first sensing patterns extend in a first direction. The second sensing patterns are disposed on the first sensing patterns and extend in a second direction crossing the first direction. The ground patterns are between the first sensing patterns and the controller IC.

20 Claims, 21 Drawing Sheets

FINGERPRINT SENSOR PACKAGE AND SMART CARD INCLUDING THE SAME

CROSS-REFERENCE TO RELATED APPLICATION

This application claims priority under 35 U.S.C. § 119 to Korean Patent Application No. 10-2020-0092542, filed on Jul. 24, 2020, in the Korean Intellectual Property Office, the disclosure of which is incorporated by reference herein in its entirety.

TECHNICAL FIELD

The present inventive concept relates to a fingerprint sensor package and a smart card including the fingerprint sensor package.

DISCUSSION OF THE RELATED ART

A fingerprint sensor that provides a fingerprint recognition function is widely used as a means to provide security of electronic devices. The fingerprint sensor may be a type that uses visible light, a type that uses a radio frequency (RF) wave, and a type that uses a change in capacitance (hereinafter, a capacitance method). The fingerprint sensor of the capacitance method may be further classified into printed circuit board (PCB) type and silicon type.

To increase the fingerprint recognition rate of the fingerprint sensor of the capacitance method, it may be desirable to increase the resolution of the fingerprint sensor, and the resolution of fingerprint sensor is proportional to an area of the sensor. The PCB-type fingerprint sensor of the capacitance method has a lower production cost compared to the silicon-type fingerprint sensor of the capacitance method. In addition, the PCB-type fingerprint sensor of the capacitance method has relatively high flexibility and may be formed in various shapes, and accordingly, it can be easily applied to various applications.

SUMMARY

According to an exemplary embodiment of the present inventive concept, a smart card includes: an integrated circuit (IC) chip storing information; and a fingerprint sensor package sensing a user's fingerprint and transmitting a signal for a sensing result to the IC chip, wherein the fingerprint sensor package includes: a plurality of first sensing patterns disposed in a sensing region of the fingerprint sensor package and extending in a first direction; first ground patterns disposed in an edge region that at least partially surrounds the sensing region, wherein the first ground patterns are disposed at substantially the same level as the first sensing patterns, and applied with a reference potential; a plurality of second sensing patterns disposed in the sensing region of the fingerprint sensor package and extending in a second direction crossing the first direction; and second ground patterns disposed in the edge region, and at substantially the same level as the second sensing patterns, wherein the second ground patterns are connected to the first ground patterns, wherein the first sensing patterns and the second sensing patterns are spaced apart from each other in a third direction substantially perpendicular to each of the first and second directions, and the first sensing patterns and the second sensing patterns constitute a plurality of capacitors.

According to an exemplary embodiment of the present inventive concept, a fingerprint sensor package includes: a package substrate; and a controller integrated circuit (IC) mounted on the package substrate and configured to determine whether a registered fingerprint matches a sensed fingerprint, wherein the package substrate includes: a base layer; an upper insulating layer disposed on a first surface of the base layer; a lower insulating layer disposed on a second surface of the base layer; an upper protective layer disposed on the upper insulating layer; a lower protective layer disposed on the lower insulating layer; first conductive patterns covered by the lower protective layer, and including first ground patterns, power patterns, signal patterns, first pads, and second pads; second conductive patterns disposed on the lower insulating layer, and including second ground patterns, third pads, and fourth pads, wherein the second ground patterns are connected to the first ground patterns, wherein the third pads are connected to the first pads, and wherein the fourth pads are connected to the second pads; third conductive patterns covered by the upper insulating layer, and including third ground patterns, first sensing patterns, and fifth pads, wherein the third ground patterns are connected to the second ground patterns, wherein the first sensing patterns are connected to the third pads and extending in a first direction parallel to an upper surface of the package substrate, and wherein fifth pads are connected to the fourth pads; and fourth conductive patterns covered by the upper protective layer, and including fourth ground patterns and second sensing patterns, wherein the fourth ground patterns are connected to the third ground patterns, wherein the second sensing patterns are connected to the fifth pads, and wherein the fourth conductive patterns extends in a second direction that crosses the first direction and is substantially parallel to the upper surface of the package substrate, wherein a sensing region and an edge region surrounding the sensing region are provided on the package substrate, wherein the first and second sensing patterns are disposed in the sensing region, the upper protective layer includes upper openings that expose a portion of the fourth ground patterns, and the lower protective layer includes lower openings that expose portions of each of the first ground patterns, the power patterns, and the signal patterns.

According to an exemplary embodiment of the present inventive concept, a fingerprint sensor package includes: a package substrate; and a controller integrated circuit (IC) mounted on the package substrate and configured to determine whether a registered fingerprint matches a sensed fingerprint, wherein the package substrate includes: first conductive patterns including first ground patterns, power patterns, signal patterns, first pads, and second pads, wherein the first ground patterns receive a reference potential, wherein the power patterns receive a power potential, wherein the signal patterns are configured to output a signal of the controller IC, and wherein the first conductive patterns are connected to the controller IC; second conductive patterns including second ground patterns, third pads, and fourth pads, wherein the second ground patterns are connected to the first ground patterns, wherein the third pads are connected to the first pads, wherein the fourth pads are connected to the second pads, and wherein the second conductive patterns are disposed on the first conductive patterns; third conductive patterns including third ground patterns, first sensing patterns, fifth pads, wherein the third ground patterns are connected to the second ground patterns, wherein the first sensing patterns have a line shape extending in a first direction parallel to an upper surface of the package substrate and are connected to the third pads, wherein the fifth pads are connected to the fourth pads, and wherein the third conductive patterns are disposed on the second conductive patterns; and fourth conductive patterns including fourth ground patterns and second sensing patterns, wherein the fourth ground patterns are connected to the third ground patterns, and wherein the second sensing patterns have a line shape extending in a second direction, which is parallel to the upper surface of the package substrate and crosses the first direction, and are connected to the fifth pads, and wherein the fourth conductive patterns are disposed on the third conductive patterns, wherein a sensing region and an edge region surrounding the sensing region are provided on the package substrate, wherein the first and second sensing patterns are disposed in the sensing region, and wherein the third and fourth ground patterns are disposed in the edge region.

BRIEF DESCRIPTION OF THE DRAWINGS

The above and other features of the present inventive concept will become more apparent by describing in detail exemplary embodiments thereof, with reference to the accompanying drawings, in which.

DETAILED DESCRIPTION OF THE EMBODIMENTS

Figure 1:
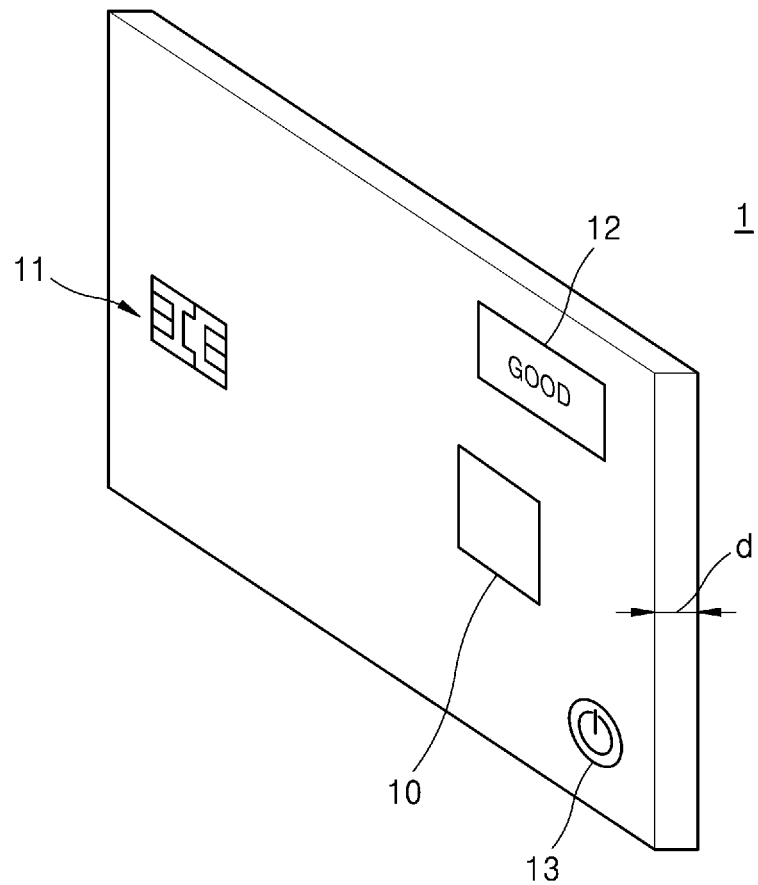
FIG. 1 is a schematic diagram illustrating a smart card according to an exemplary embodiment of the present inventive concept.

Hereinafter, exemplary embodiments of the present inventive concept will be described in detail with reference to the accompanying drawings. It is to be understood that the same reference numerals are used for the same components throughout the drawings, and duplicate descriptions thereof may be omitted.

FIG. 1 is a schematic diagram illustrating a smart card 1 according to an exemplary embodiment of the present inventive concept.

Referring to FIG. 1, the smart card 1 may include a fingerprint sensor package 10, an integrated circuit (IC) chip 11, a display unit 12, and a power button 13. For example, the smart card 1 may further include a card number identification unit, a valid period identification unit, and the like. As another example, the smart card 1 may further include an RF chip. For example, the smart card 1 may include a credit card, a check card, or the like.

The power button 13 may turn on/off the smart card 1. The smart card 1 at an off-state may be turned on by the operation of the power button 13, and the smart card 1 at an on-state may be turned off by the operation of the power button 13. For example, when a set time elapses after the smart card 1 is switched to the on-state, the smart card 1 may be automatically switched to the off-state.

After the smart card 1 is switched to the on-state, when a user contacts his or her fingerprint with a fingerprint sensor of the fingerprint sensor package 10, the fingerprint sensor package 10 may sense the fingerprint that has contacted the fingerprint sensor package 10. The fingerprint sensor package 10 may compare the sensed fingerprint to a registered fingerprint to determine whether the sensed fingerprint matches the registered fingerprint.

The IC chip 11 may store encrypted financial information. When the sensed fingerprint matches the registered fingerprint, the IC chip 11 may grant payment authority to the user of the smart card 1. The display unit 12 may display whether the sensed fingerprint matches the registered fingerprint.

According to an exemplary embodiment of the present inventive concept, the smart card 1 may prevent financial accidents due to theft by granting payment authority to the user based on a sensing result of the fingerprint sensor package 10. According to an exemplary embodiment of the present inventive concept, a thickness d of the smart card 1 may range from about 0.5 mm to about 1 mm. According to an exemplary embodiment of the present inventive concept, the thickness d of the smart card 1 may be about 0.84 mm or less in accordance with international standards. According to an exemplary embodiment of the present inventive concept, the thickness d of the smart card 1 may be about 0.76 mm or less. Accordingly, the smart card 1, according to an exemplary embodiment of the present inventive concept, including the fingerprint sensor package 10 may provide a relatively high level of user experience.

Figure 2A:
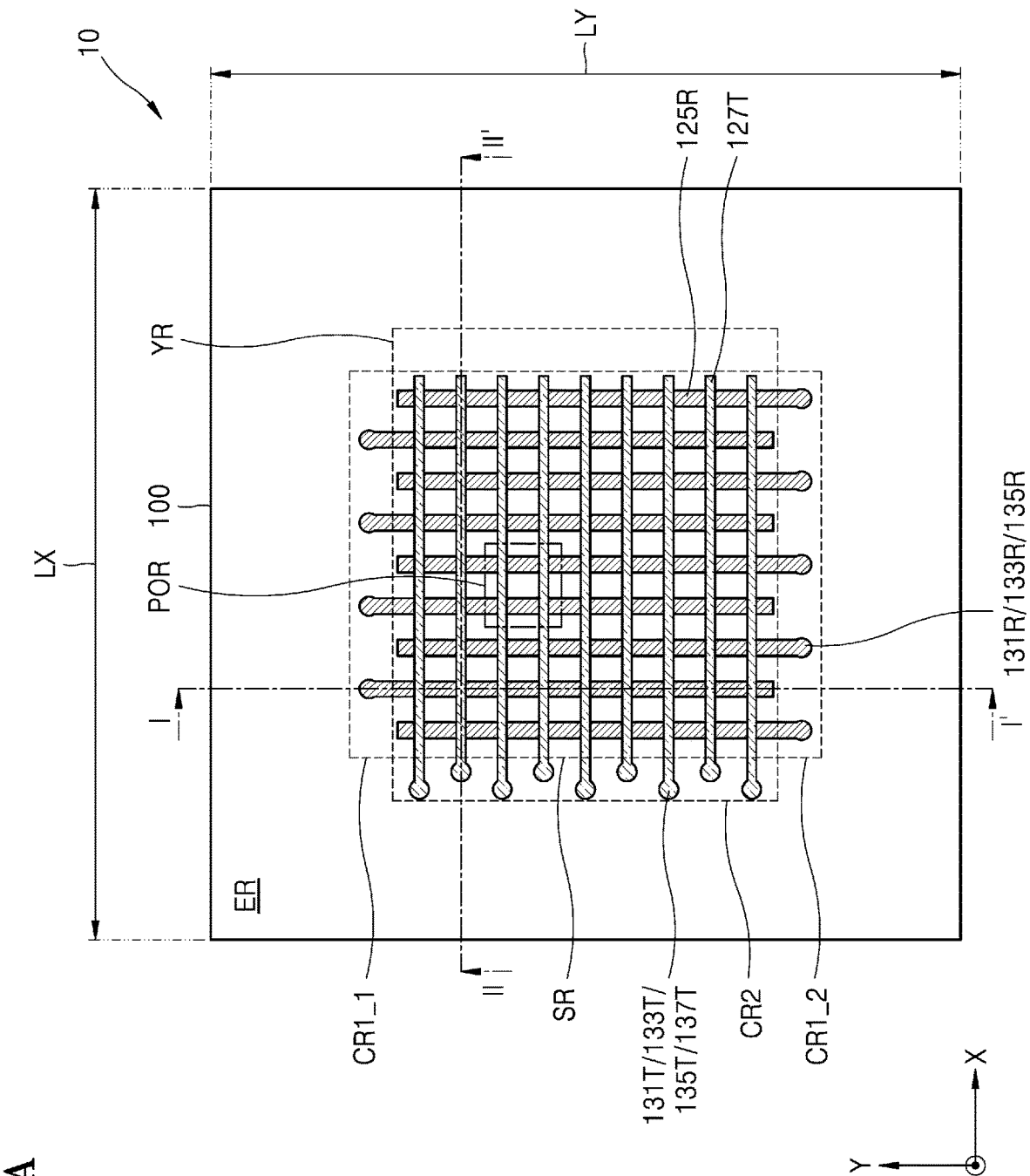
FIG. 2A is a schematic plan view illustrating a layout of a fingerprint sensor package according to an exemplary embodiment of the present inventive concept.
Figure 2B:
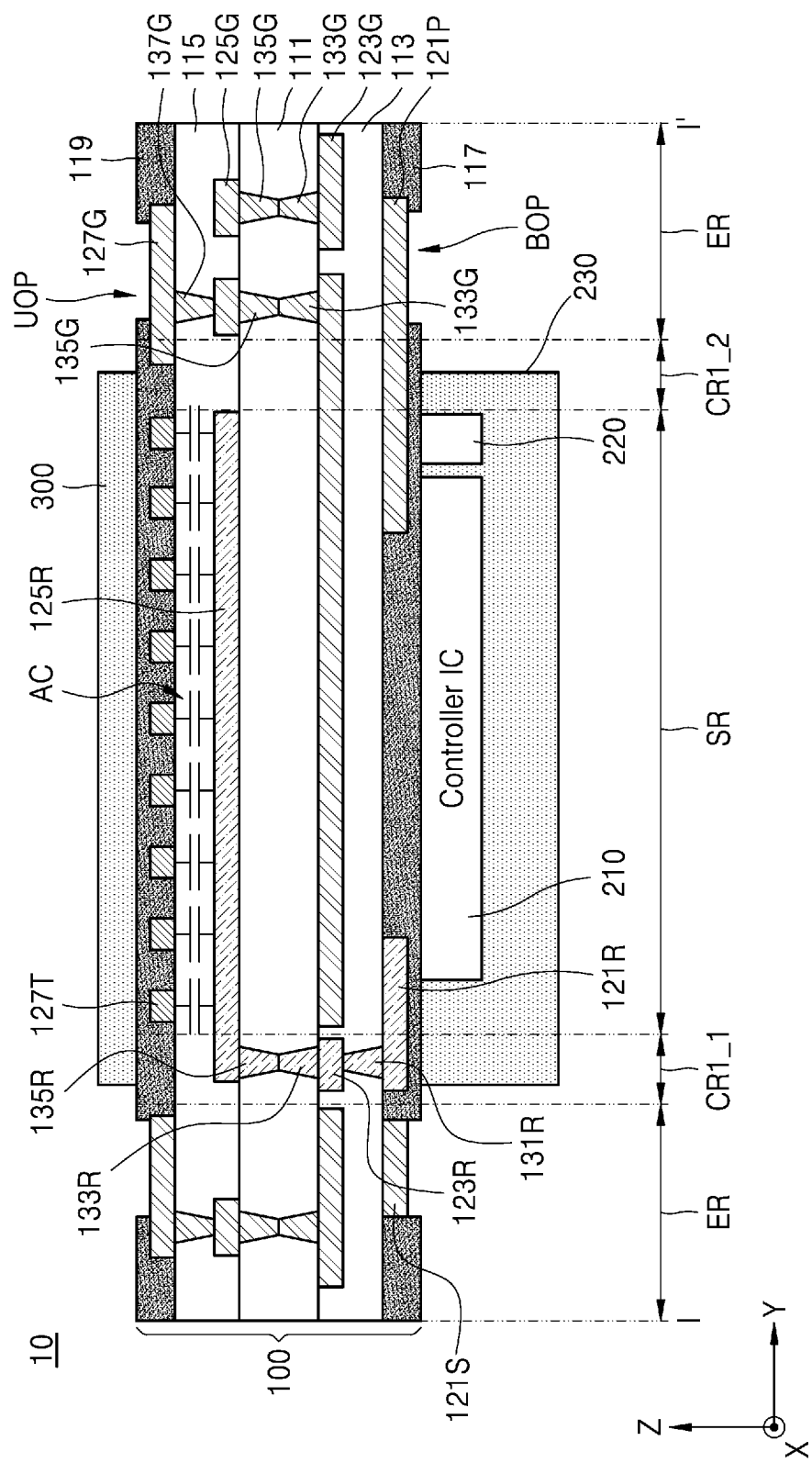
FIG. 2B is a cross-sectional view along line I-I' of FIG. 2A.
Figure 2C:
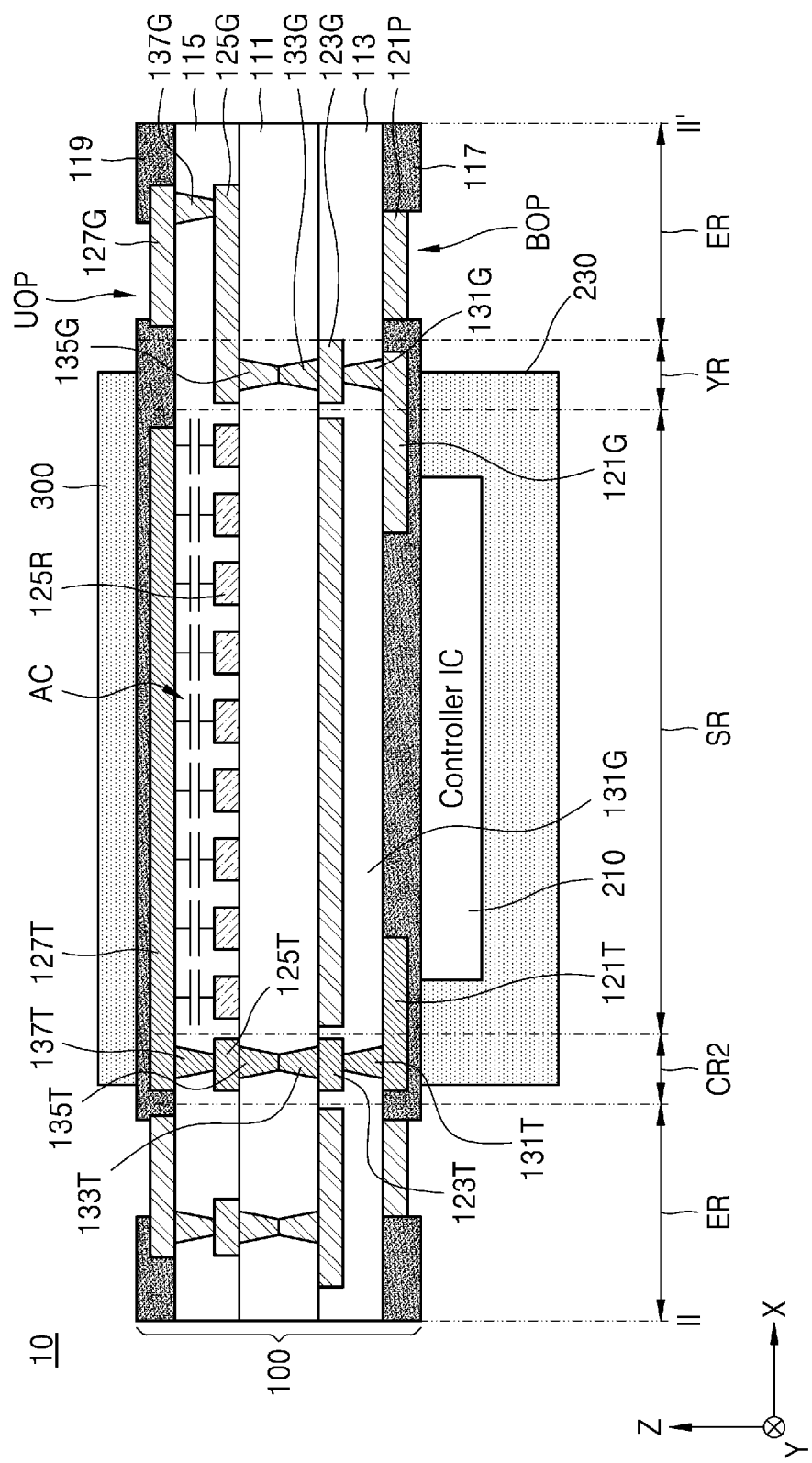
FIG. 2C is a cross-sectional view along line II-II' of FIG. 2A.

FIG. 2A is a schematic plan view illustrating a layout of a fingerprint sensor package 10 according to an exemplary embodiment of the present inventive concept. In FIG. 2A, for convenience, regions SR, CR1_1, CR1_2, CR2, YR, and ER, first and second sensing patterns 125R and 127T, and first to fourth conductive vias 131R, 133R, 135R, 131T, 133T, 135T, and 137T are shown. Regions SR, CR1_1, CR1_2, CR2, YR, and ER are provided in the package substrate 100. The first and second sensing patterns 125R and 127T may be arranged within the regions SR, CR1_1, CR1_2, CR2, YR, and ER FIG. 2B is a cross-sectional view along line I-I' of FIG. 2A, and FIG. 2C is a cross-sectional view along line II-II' of FIG. 2A.

Figure 2D:
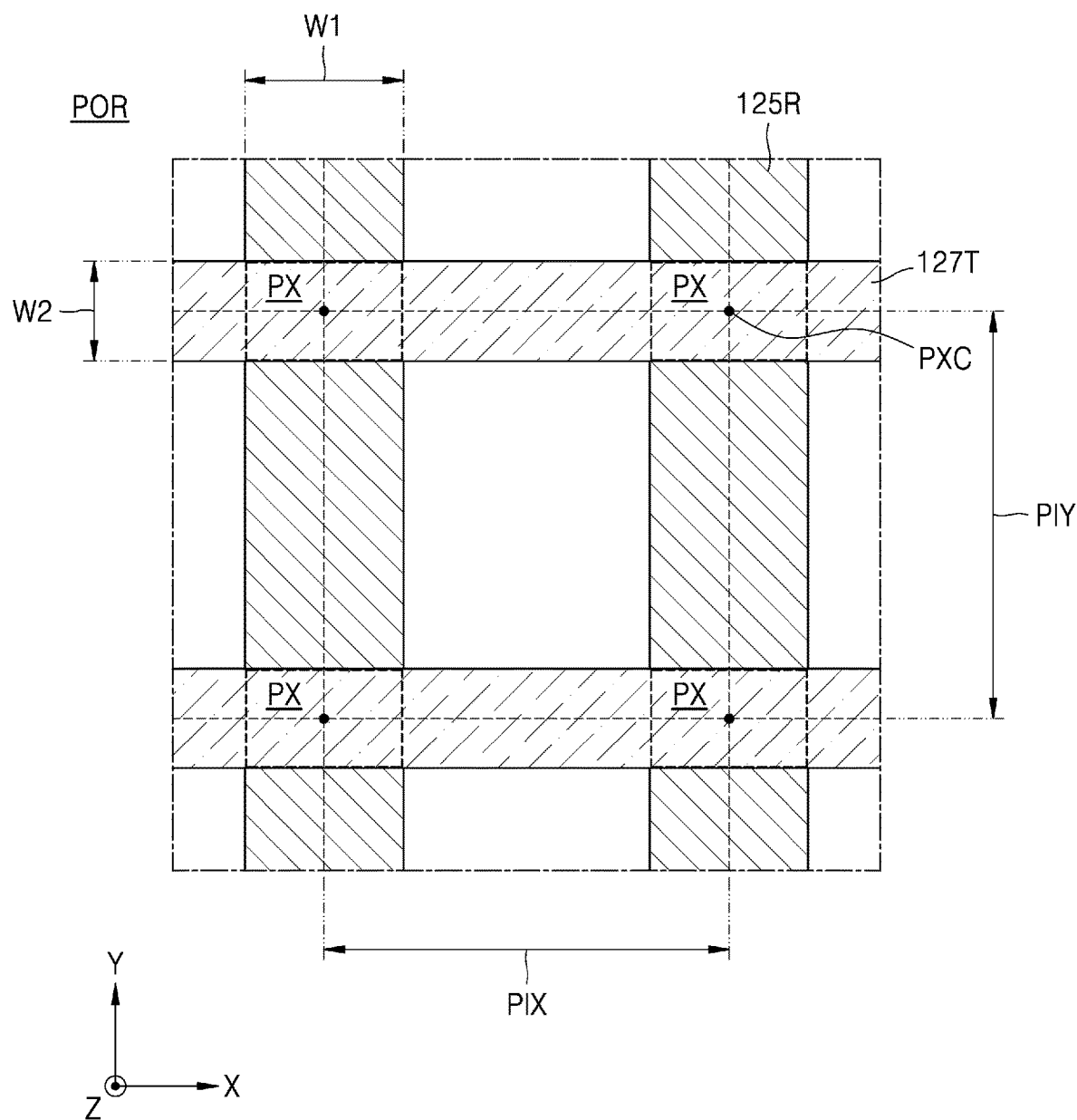
FIG. 2D is an enlarged partial plan view illustrating a portion POR of FIG. 2A.

FIG. 2D is an enlarged partial plan view illustrating a portion POR of FIG. 2A.

Referring to FIGS. 2A to 2D, the fingerprint sensor package 10 may include a package substrate 100, a controller IC 210, a passive device 220, a mold 230, and a sensing part coating layer 300.

The package substrate 100 may include a base layer 111, a lower insulating layer 113, an upper insulating layer 115, a lower protective layer 117, an upper protective layer 119, first conductive patterns 121G, 121P, 121R, 121S, and 121T, second conductive patterns 123G, 123R, and 123T, third conductive patterns 125G, 125R, and 125T, fourth conductive patterns 127G and 127T, first conductive vias 131G, 131R, and 131T, second conductive vias 133G, 133R, and 133T, third conductive vias 135G, 135R, and 135T, and fourth conductive vias 137G and 137T. According to an exemplary embodiment of the present inventive concept, the package substrate 100 may include a printed circuit board (PCB) or a flexible PCB (FPCB).

In an exemplary embodiment of the present inventive concept, the package substrate 100 may include a PCB including, for example, a four-layered conductive layer. The first conductive patterns 121G, 121P, 121R, 121S, and 121T may constitute conductive layers of a first layer, and the second conductive patterns 123G, 123R, and 123T may constitute conductive layers of a second layer. In addition, the third conductive patterns 125G, 125R, and 125T may constitute conductive layers of a third layer, and the fourth conductive patterns 127G and 127T may constitute conductive layers of a fourth layer. For example, the package substrate 100 may have a substantially rectangular planar shape. For example, the package substrate 100 may have a substantially square planar shape. A direction parallel to a pair of edges of the package substrate 100 may be an X direction. A direction parallel to the other pair of edges may be a Y direction, and a direction substantially perpendicular to an upper surface of the package substrate 100 may be a Z direction.

A length LX of the package substrate 100 in the X direction may range from about 10 mm to about 15 mm. A length LY of the package substrate 100 in the Y direction may range from about 10 mm to about 15 mm. The length LX of the package substrate 100 in the X direction may be about 12.7 mm. The length LY of the package substrate 100 in the Y direction may be about 12.7 mm.

A height (e.g., a length in the Z direction) of the fingerprint sensor package 10 may be about 0.76 mm or less. The height of the fingerprint sensor package 10 may be about 0.5 mm or less. The height of the fingerprint sensor package 10 may range from about 0.1 mm to about 0.4 mm. Accordingly, the fingerprint sensor package 10 may be easily applied to a variety of applications that have flexibility or a thin thickness (e.g., the smart card 1 of FIG. 1).

A sensing region SR, first contact regions CR1_1 and CR1_2, a second contact region CR2, a wiring region YR, and an edge region ER may be provided on the package substrate 100. The sensing region SR may be a region in which the first and second sensing patterns 125R and 127T for fingerprint recognition are disposed. The first contact regions CR1_1 and CR1_2 may be regions in which the first to third conductive vias 131R, 133R, and 135R, for connection between the first sensing patterns 125R and a controller IC 210, are disposed. The second contact region CR2 may be a region in which first to fourth conductive vias 131T, 133T, 135T, and 137T, for connection between the second sensing patterns 127T and the controller IC 210, are disposed. The wiring region YR may be a region in which at least some of the first to third conductive vias 131G, 133G, and 135G, for connection between ground patterns 127G and the controller IC 210, are disposed. The sensing region SR may be arranged approximately at a center of the package substrate 100, but is not limited thereto. In an exemplary embodiment of the present inventive concept, the sensing region SR may be an approximately square region. A plurality of first sensing patterns 125R extending in the Y direction and a plurality of second sensing patterns 127T extending in the X direction may be disposed in the sensing region SR. For example, the plurality of first sensing patterns 125R may be spaced apart from each other in the X direction and may have line shapes or rectangular shapes respectively extending in the Y direction. For example, the plurality of second sensing patterns 127T may be spaced apart from each other in the Y direction and may have line shapes or rectangular shapes respectively extending in the X direction.

The first contact region CR1_1 may be formed at one end of the sensing region SR, and the first contact region CR1_2 may be formed at the other end of the sensing region SR, in the Y direction. The wiring region YR may be formed at one end of the sensing region SR, and the second contact region CR2 may be formed at the other end of the sensing region SR, in the X direction. The edge region ER may horizontally surround the sensing region SR, the first contact regions CR1_1 and CR1_2, and the second contact region CR2. Ground patterns 121G, 123G, 125G and 127G for providing a reference potential and shielding noise may be disposed in the edge region ER.

The first sensing patterns 125R may extend in the sensing region SR and the first contact regions CR1_1 and CR1_2. The first sensing patterns 125R may be connected to the controller IC 210 through the first to third conductive vias 131R, 133R, and 135R which are disposed in the first contact regions CR1 . . . 1 and CR1_2.

Some of the first sensing patterns 125R may be connected to the first to third conductive vias 131R, 133R, and 135R which are disposed in the first contact region CR1_1, and others of the first sensing patterns 125R may be connected to the first to third conductive vias 131R, 133R, and 135R which are disposed in the first contact region CR1_2. The first to third conductive vias 131R, 133R, and 135R in the first contact regions CR1_1 and the first to third conductive vias 131R, 133R, and 135R in the first contact region CR1_2 may be respectively arranged in the X direction.

The adjacent first sensing patterns 125R may be respectively connected to the first to third conductive vias 131R, 133R, and 135R which are disposed in different first contact regions CR1_1 and CR1_2. For example, a first sensing pattern 125R adjacent to a second first sensing pattern 125R, which is connected to the first to third conductive vias 131R, 133R, and 135R in the first contact region CR1_1, may be connected to the first to third conductive vias 131R, 133R, and 135R in the first contact region CR1_2.

The second sensing patterns 127T may extend in the sensing region SR and the second contact region CR2. The second sensing patterns 127T may be connected to the controller IC 210 through the first to fourth conductive vias 131T, 133T, 135T, and 137T disposed in the second contact region CR2. For example, the first to fourth conductive vias 131T, 133T, 135T, and 137T corresponding to adjacent second sensing patterns 127T may be staggered in a zigzag or alternating manner in the Y direction. For example, first to fourth conductive vias 131T, 133T, 135T, and 137T of a second sensing pattern 127T may be closer to the edge region ER in the X direction than first to fourth conductive vias 131T, 133T, 135T, and 137T of another second sensing pattern 127T adjacent to the second sensing pattern 127T.

The first sensing patterns 125R may have a first width W1 that is a width in the X direction, and the second sensing patterns 127T may have a second width W2 that is a width in the Y direction. According to an exemplary embodiment of the present inventive concept, the first width W1 may be greater than the second width W2. According to an exemplary embodiment of the present inventive concept, the first width W1 may range from about 2 times to about 4 times the second width W2. According to an exemplary embodiment of the present inventive concept, the first width W1 may range from about 40 μm to about 70 μm, and the second width W2 may range from about 5 μm to about 25 μm.

Portions where the first sensing patterns 125R and the second sensing patterns 127T vertically overlap each other may constitute pixels PX. A pitch PIX of centers PXC of the pixels PX in the X direction may be substantially the same as a pitch PIY of the centers PXC of the pixels PX in the Y direction, but the present inventive concept is not limited thereto. The pitch PIX in the X direction and the pitch PIY in the Y direction may range from about 50 μm to about 90 μm, but the present inventive concept is not limited thereto.

The pixels PX may have a synthesized capacitance value, of an area capacitance (AC) by the first sensing patterns 125R and the second sensing patterns 127T overlapping each other in the Z direction, and a fringing capacitance by the first sensing patterns 125R and the second sensing patterns 127T that do not overlap each other in the Z direction.

When the user's fingerprint contact with the sensing part coating layer 300, a capacitance value corresponding to each of the pixels PX may be changed by a capacitor induced between the second sensing patterns 127T and the user's fingerprint. The change of the capacitance value may be determined according to the shape of the user's fingerprint, and therefore the controller IC 210 may identify the user's fingerprint from the change of the capacitance in the pixels PX.

The base layer 111 may include, for example, an insulating material. The base layer 111 may include, for example, resin and glass fiber. The resin included in the base layer 111 may include at least one of a phenol resin, an epoxy resin, and/or a polyimide. According to an exemplary embodiment of the present inventive concept, the base layer 111 may include at least one of flame retardant 4 (FR4), tetrafunctional epoxy, polyphenylene ether, epoxy/polyphenylene oxide, bismaleimide triazine (BT), thermount, cyanate ester, polyimide, prepreg, Ajinomoto build-up film (ABF) from Ajinomoto Co., Inc, and/or liquid crystal polymer. However, the present inventive concept is not limited thereto, and for example, the base layer 111 may include silicon oxide, silicon oxynitride, silicon nitride, or combinations thereof. For example, the glass fiber included in the base layer 111 may be a reinforcing member, and the glass fiber may be obtained by collective processing glass filaments of about 5 μm to about 15 μm which may be obtained by melting and extracting glass material at a relatively high temperature. The glass filament may be an ore-processed product containing silica as a main component.

Second conductive patterns 123G, 123R, and 123T may be disposed on a lower surface of the base layer 111, and third conductive patterns 125G, 125R, and 125T may be disposed on an upper surface of the base layer 111. The second conductive patterns 123G, 123R, and 123T and the third conductive patterns 125G, 125R and 125T may include a conductive material. The second conductive patterns 123G, 123R, and 123T and the third conductive patterns 125G, 125R, and 125T may include at least one of copper (Cu), aluminum (Al), nickel (Ni), silver (Ag), gold (Au), platinum (Pt), tin (Sn), lead (Pb), titanium (Ti), chromium (Cr), palladium (Pd), indium (In), zinc (Zn), carbon (C) and graphene, or alloy metals thereof. First conductive patterns 121G, 121P, 121R, 121S, and 121T and fourth conductive patterns 127G and 127T, which will be described later, may also include the materials described above, in relation to the second conductive patterns 123G, 123R, and 123T and the third conductive patterns 125G, 125R, and 125T.

The third conductive patterns 125G, 125R, and 125T may include ground patterns 125G to which the reference potential is applied, first sensing patterns 125R for recognizing the user's fingerprint, and pads 125T. The first sensing patterns 125R may be disposed in the sensing region SR, and the ground patterns 125G may be disposed in the wiring region YR and the edge region ER. For example, the ground patterns 125G may not be disposed in the sensing region SR. The pads 125T may be disposed in the second contact region CR2. The pads 125T may provide a path for electrical connection between the second sensing patterns 127T and the controller IC 210.

The second conductive patterns 123G, 123R and 123T may include ground patterns 123G to which the reference potential is applied, and pads 123R and 123T. The ground patterns 123G may be disposed in the sensing region SR, the wiring region YR, and the edge region ER. The ground patterns 123G may be horizontally spaced apart from the first and second contact regions CR1_1, CR1_2, and CR2. For example, the ground patterns 123G may not be disposed in the first and second contact regions CR1_1, CR1_2, and CR2. The ground patterns 123G may overlap the first sensing patterns 125R and the second sensing patterns 127T in the Z direction. The ground patterns 123G may be between the second sensing patterns 127T and the controller IC 210. Accordingly, the ground patterns 123G may block noise from the outside for the controller IC 210. The pads 123R may be disposed in the first contact regions CR1_1 and CR1_2, and the pads 123T may be disposed in the second contact region CR2. The pads 123R may provide a path for electrical connection between the first sensing patterns 125R and the controller IC 210, and the pads 123T may provide a path for electrical connection between the second sensing patterns 127T and the controller IC 210.

The upper insulating layer 115 may be disposed on the third conductive patterns 125G, 125R, and 125T. For example, the upper insulating layer 115 may be disposed on the upper surface of the third conductive pattern 125G, 125R, and 125T. The upper insulating layer 115 may cover the third conductive patterns 125G, 125R, and 125T. The upper insulating layer 115 may electrically separate those separated from each other among the third conductive patterns 125G, 125R, and 125T.

The lower insulating layer 113 may be disposed on the second conductive patterns 123G and 123R. For example, the lower insulating layer 113 may be disposed on the lower surface of the second conductive patterns 123G and 123R. The lower insulating layer 113 may cover the second conductive patterns 123G and 123R. The lower insulating layer 113 may electrically separate those spaced apart from each other among the second conductive patterns 123G and 123R.

The lower insulating layer 113 and the upper insulating layer 115 may respectively include at least one of phenol resin, epoxy resin, and/or polyimide. The lower insulating layer 113 and the upper insulating layer 115 may respectively include at least one of, for example, prepreg, FR4, quadrilateral epoxy, polyphenylene ether, epoxy/polyphenylene oxide, BT, thermount, cyanate ester, polyimide, and/or liquid crystal polymer.

Fourth conductive patterns 127G and 127T may be disposed on the upper insulating layer 115. For example, the fourth conductive patterns 127 and 127T may be disposed on an upper surface of the upper insulating layer 115. The fourth conductive patterns 127G and 127T may include the ground patterns 127G, to which the reference potential is applied, and the second sensing patterns 127T for recognizing the user's fingerprint. The second sensing patterns 127T may be disposed in the sensing region SR, and the ground patterns 127G may be disposed in the edge region ER.

The second sensing patterns 127T may be vertically spaced apart from the first sensing patterns 125R with the upper insulating layer 115 therebetween. The second sensing patterns 127T may be electrically insulated from the first sensing patterns 125R by the upper insulating layer 115. The second sensing patterns 127T may not be electrically shorted to the first sensing patterns 125R. Accordingly, some of the second sensing patterns 127T may constitute a first electrode of the capacitor. In addition, the upper insulating layer 115 may constitute a dielectric layer of the capacitor, and some of the first sensing patterns 125R may constitute a second electrode of the capacitor.

The upper insulating layer 115 may include a material different from the lower insulating layer 113. The upper insulating layer 115 may include a material having a dielectric constant suitable for sensing of the fingerprint sensor package 10. However, the inventive concept is not limited thereto, and the upper insulating layer 115 may include the same material as the lower insulating layer 113.

The upper protective layer 119 may be disposed on the fourth conductive patterns 127G and 127T. The upper protective layer 119 may cover the fourth conductive patterns 127G and 127T. The upper protective layer 119 may include upper openings UOP that expose a portion of the ground patterns 127G. The ground patterns 127G may contact an external connection terminal (e.g., solder) configured to provide the reference potential through the upper openings UOP. In addition, the reference potential may be applied to the ground patterns 127G through an anisotropic conductive film (ACF) or the like which is attached on the upper protective layer 119.

First conductive patterns 121G, 121P, 121R, 121S, and 121T may be disposed on the lower surface of the lower insulating layer 113. The first conductive patterns 121G, 121P, 121R, 121S, and 121T may include power patterns 121P for supplying external power, ground patterns 121G to which the reference potential is applied, signal patterns 121S for outputting a sensing result (e.g., whether the sensed fingerprint matches the registered fingerprint) of the fingerprint sensor package 10 to the outside (for example, the IC chip 11 and the display unit 12 of FIG. 1), and pads 121R and 121T.

The first conductive patterns 121G, 121P, 121R, 121S, and 121T may be connected to the controller IC 210. The power patterns 121P may provide a power potential to the controller IC 210. The ground patterns 121G may provide the reference potential to the controller IC 210, and the pads 121R and 121T may transmit signals sensed by the first and second sensing patterns 125R and 127T to the controller IC 210. Between the controller IC 210 and the first conductive patterns 121G, 121P, 121R, 121S, and 121T, a connection terminal (e.g., solder) may be further provided for electrically connecting the controller IC 210 to the first conductive patterns 121G, 121P, 121R, 121S, and 121T.

The pads 121R may extend from the first contact regions CR1_1 and CR1_2 to a portion vertically overlapping the controller IC 210, and the pads 121T may be formed from the second contact region CR2 to a portion vertically overlapping the controller IC 210. The pads 121R may provide a path for electrical connection between the first sensing patterns 125R and the controller IC 210, and the pads 121T may provide a path for electrical connection between the second sensing patterns 127T and the controller IC 210.

The lower protective layer 117 may be disposed on the first conductive patterns 121G, 121P, 121R, 121S, and 121T. The lower protective layer 117 may cover the first conductive patterns 121G, 121P, 121R, 121S, and 121T. The lower protective layer 117 may include bottom openings BOP that expose portions of the power patterns 121P, the ground patterns 121G, and the signal patterns 121S. The power patterns 121P may contact the external connection terminal (e.g., solder) configured to provide the power potential through the bottom openings BOP, and the ground patterns 121G may contact the external connection terminal (e.g., solder) configured to provide the reference potential.

The lower protective layer 117 and the upper protective layer 119 may each be an insulating coating film. The lower protective layer 117 and the upper protective layer 119 may be, for example, solder resist layers. For example, the lower protective layer 117 and the upper protective layer 119 may include a material having excellent heat resistance, insulating properties, and mechanical strength, for example, a polymer material. The lower protective layer 117 and the upper protective layer 119 may include, for example, at least one of polyimide, polyamide, polyacetal, polycarbonate, modified polyphenol oxide, polybutylene terephthalate, polysulfone, polyphenylene sulfide, polyamide imide, polyacrylate, polyether sulfone, polyether ether ketone, polyether imide, polyarylate, polyether ketone, and/or polybenzimidazole.

The embodiment shown in FIGS. 2A to 2D has illustrated that the ground patterns 121G and 127G to which the reference potential is applied may be respectively disposed on lower and upper portions of the package substrate 100, and the power patterns 121P to which the power potential is applied may be disposed on the lower portion of the package substrate 100, but this is only for illustration and does not limit the present inventive concept in any manner. For example, the power patterns 121P may be respectively disposed on the upper and lower portions of the package substrate 100, and the ground patterns 121G may be disposed only on the lower portion of the package substrate 100.

The first conductive vias 131G, 131R, and 131T may be between the first conductive patterns 121G, 121R, and 121T and the second conductive patterns 123G, 123R, and 123T. For example, the first conductive vias 131G, 131R, and 131T may have a tapered structure toward the base layer 111. Here, the tapered structure toward the base layer 111 may refer to a structure in which a width (e.g., horizontal width) decreases towards the base layer 111. However, the present inventive concept is not limited thereto. For example, the first conductive vias 131G, 131R, and 131T may have a tapered structure away from the base layer 111.

The first conductive vias 131G, 131R, and 131T may provide electrical connection between the first conductive patterns 121G, 121R, and 121T and the second conductive patterns 1230, 123R, and 123T. For example, the first conductive vias 131G may provide electrical connection between the ground patterns 121G and the ground patterns 123G. Further, the first conductive vias 131R may provide electrical connection between the pads 121R and the pads 123R, and the first conductive vias 131T may provide electrical connection between the pads 121T and the pads 123T. The first conductive vias 131R may be disposed in the first contact regions CR1_1 and CR1_2. The first conductive vias 131T may be disposed in the second contact region CR2, and the first conductive vias 131G may be disposed in the wiring region YR.

The second conductive vias 133G, 133R, and 133T and the third conductive vias 135G, 135R, and 135T may be between the second conductive patterns 123G, 123R, and 123T and the third conductive patterns 125G, 125R, and 125T. For example, the second conductive vias 133G, 133R, and 133T and the third conductive vias 135G, 135R, and 135T may be disposed above the first conductive vias 131G, 131R, and 131T. For example, the second conductive vias 133G, 133R, and 133T and the third conductive vias 135G, 135R, and 135T may respectively have the tapered structure toward a center of the base layer 111. However, the present inventive concept is not limited thereto. For example, the second conductive vias 133G, 133R, and 133T and the third conductive vias 135G, 135R, and 135T may respectively have the tapered structure away from the center of the base layer 111. According to an exemplary embodiment of the present inventive concept, the contact surface between the second conductive vias 133G, 133R, and 133T and the third conductive vias 135G, 135R, and 135T, respectively, may have a minimum width. The second conductive vias 133G, 133R, and 133T and the third vias 135G, 135R, and 135T may provide electrical connection between the second conductive patterns 123G, 123R, and 123T and the third conductive patterns 125G, 125R, and 125T, respectively.

The second conductive vias 133G, 133R, and 133T may contact the second conductive patterns 123G, 123R, and 123T, respectively. The third conductive vias 135G, 135R, and 135T may contact the third conductive patterns 125G, 125R, and 125T, respectively, and the second conductive vias 133G, 133R, 133T may contact the third conductive vias 135G, 135R, and 135T, respectively.

For example, the second conductive vias 133G may contact the ground patterns 123G and the third conductive vias 135G, and the third conductive vias 135G may contact the third ground patterns 125G. The second conductive vias 133R may contact the second pads 123R and the third conductive vias 135R, and the third conductive vias 135R may contact the first sensing patterns 125R. The second conductive vias 133T may contact the second pads 123T and the third conductive vias 135T, and the third conductive vias 135T may contact the third pads 125T.

The fourth conductive vias 137G and 137T may be between the third conductive patterns 125G, 125R and 125T and the fourth conductive patterns 127G and 127T. For example, the fourth conductive vias 137G and 137T may have the tapered structure toward the base layer 111. However, the present inventive concept is not limited thereto.

The fourth conductive vias 137G and 137T may provide electrical connection between the third conductive patterns 125G, 125R, and 125T and the fourth conductive patterns 127G and 127T. For example, the fourth conductive vias 137G may provide electrical connection between the ground patterns 125G and the ground patterns 127G, and the fourth conductive vias 137T may provide electrical connection between the pads 125T and the second sensing patterns 127T. The fourth conductive vias 137T may be disposed in the second contact region CR2, and the fourth conductive vias 137G may not be disposed in the second contact region CR2.

The controller IC 210 and the passive device 220 may be disposed on the lower protective layer 117. The passive device 220 may include, for example, a multilayer ceramic capacitor (MLCC), but the present inventive concept is not limited thereto. According to an exemplary embodiment of the present inventive concept, the controller IC 210 may be partially disposed in the sensing region SR. According to an exemplary embodiment of the present inventive concept, the controller IC 210 may be entirely disposed within the sensing region SR. According to an exemplary embodiment of the present inventive concept, the controller IC 210 may be entirely disposed outside the sensing region SR. According to an exemplary embodiment of the present inventive concept, the controller IC 210 may be disposed in the sensing region SR and outside the sensing region SR. The controller IC 210 may include an arbitrary component for performing an operation for recognizing the user's fingerprint from the change of capacitance value of each of the pixels PX, such as a memory and a processor.

The mold 230 may be provided on the lower protective layer 117, the controller IC 210, and the passive device 220. The mold 230 may cover and protect the controller IC 210 and the passive device 220.

The sensing part coating layer 300 may be provided on the upper protective layer 119. The sensing part coating layer 300 may cover and protect the sensing region SR of the package substrate 100. The sensing part coating layer 300 may include, for example, glass and plastic, but the present inventive concept is not limited thereto. The sensing part coating layer 300 may include a material (e.g., a high dielectric material) having a dielectric constant suitable for sensing the fingerprint.

FIGS. 3A to 3D are views illustrating a fingerprint sensor package according to an exemplary embodiment of the present inventive concept. FIGS. 3A to 3D illustrate portions PORa, PORb, PORc, and PORd corresponding to FIG. 2D.

Figure 3A:
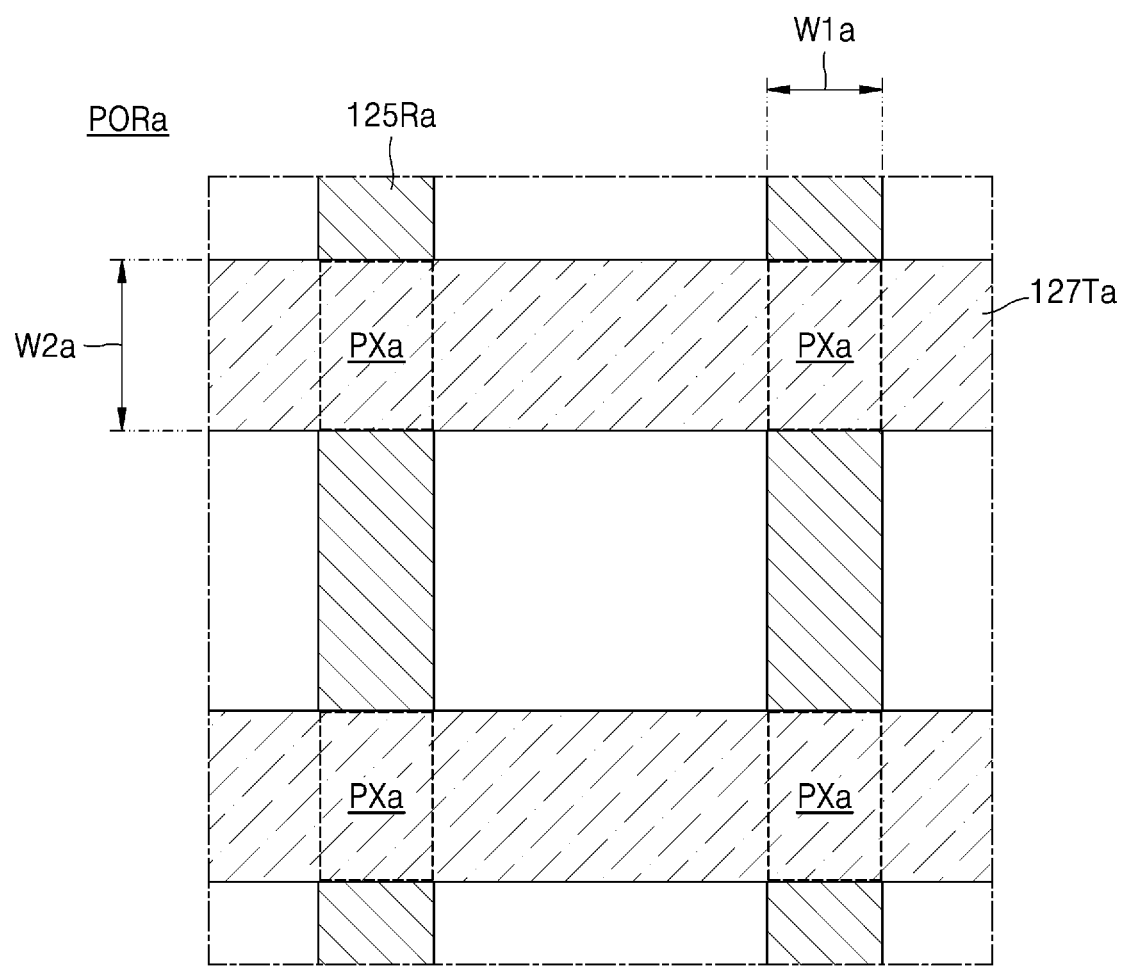
FIGS. 3A, 3B, 3C, and 3D are plan views illustrating a fingerprint sensor package according to an exemplary embodiment of the present inventive concept.

Referring to FIG. 3A, unlike in FIG. 2O, a first width W1a of the first sensing patterns 125Ra may be less than a second width W2a of the second sensing patterns 127Ta. According to an exemplary embodiment of the present inventive concept, the second width W2a may range from about 2 times to about 4 times the first width W1a. According to an exemplary embodiment of the present inventive concept, the first width W1a may range from about 5 µm to about 25 µm, and the second width W2a range from about 40 µm to about 70 µm.

Figure 3B:
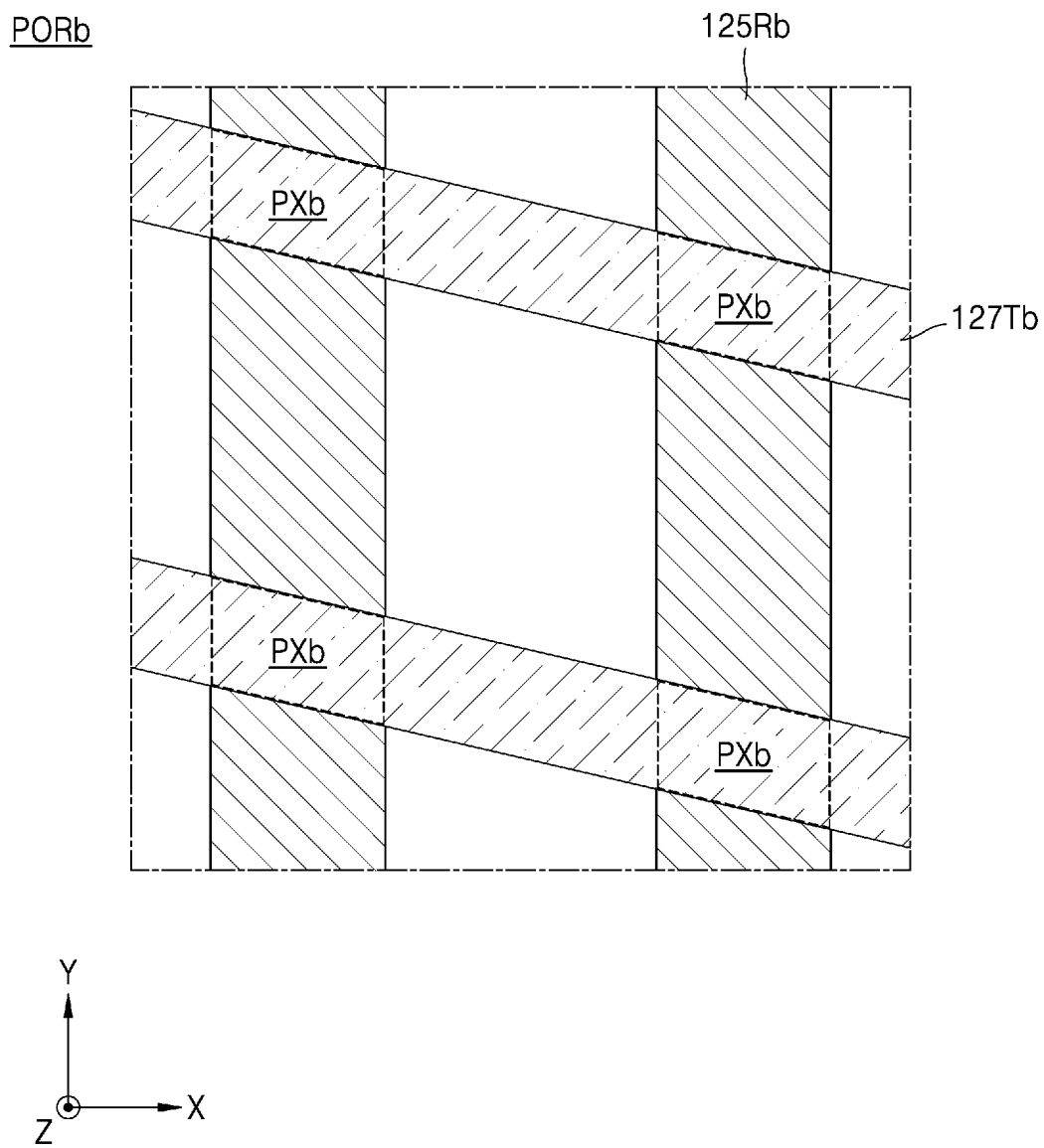

Referring to FIG. 3B, unlike in FIG. 2D, first sensing patterns 125Rb may extend substantially parallel to the Y direction, but second sensing patterns 127Tb may be oblique with respect to each of the X and Y directions. Pixels PXb may have a shape that is substantially the same as a parallelogram.

Figure 3C:
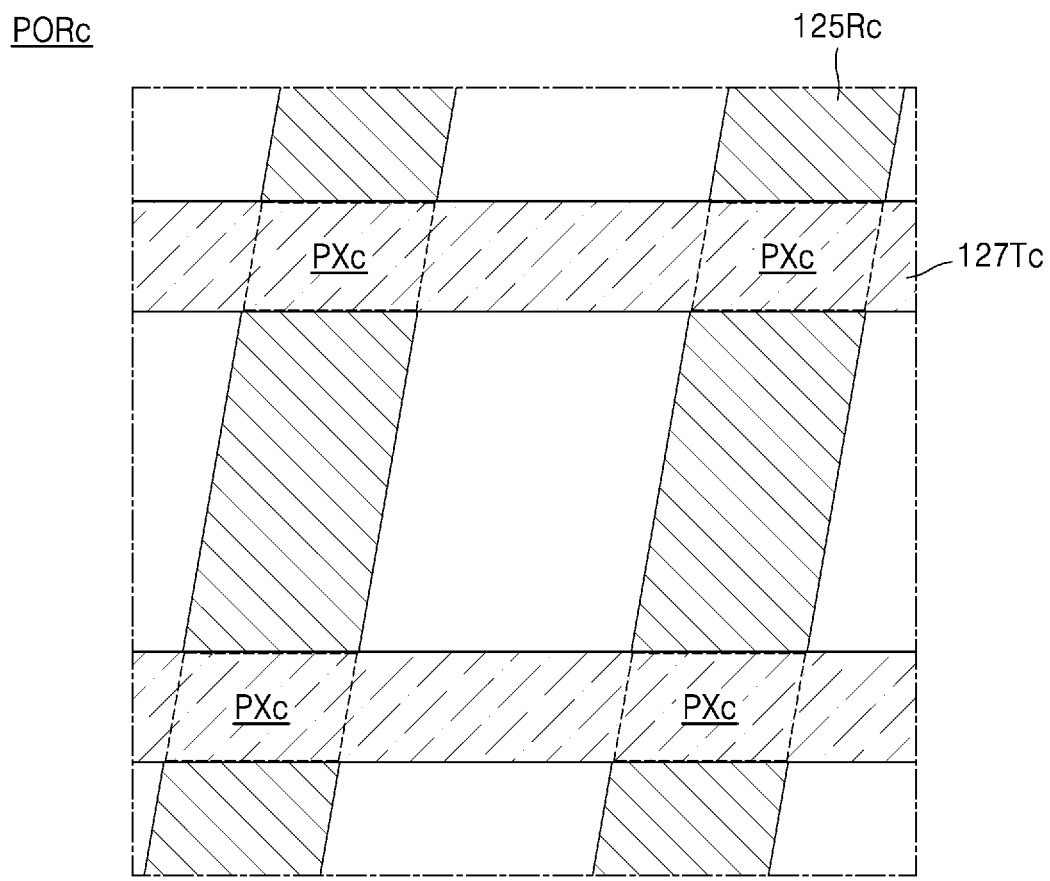

Referring to FIG. 3C, unlike in FIG. 2D, second sensing patterns 127Tc may extend substantially parallel to the Y direction, but first sensing patterns 125Rc may be oblique with respect to each of the X and Y directions. Pixels PXc may have a shape that is substantially the same as a parallelogram.

Figure 3D:
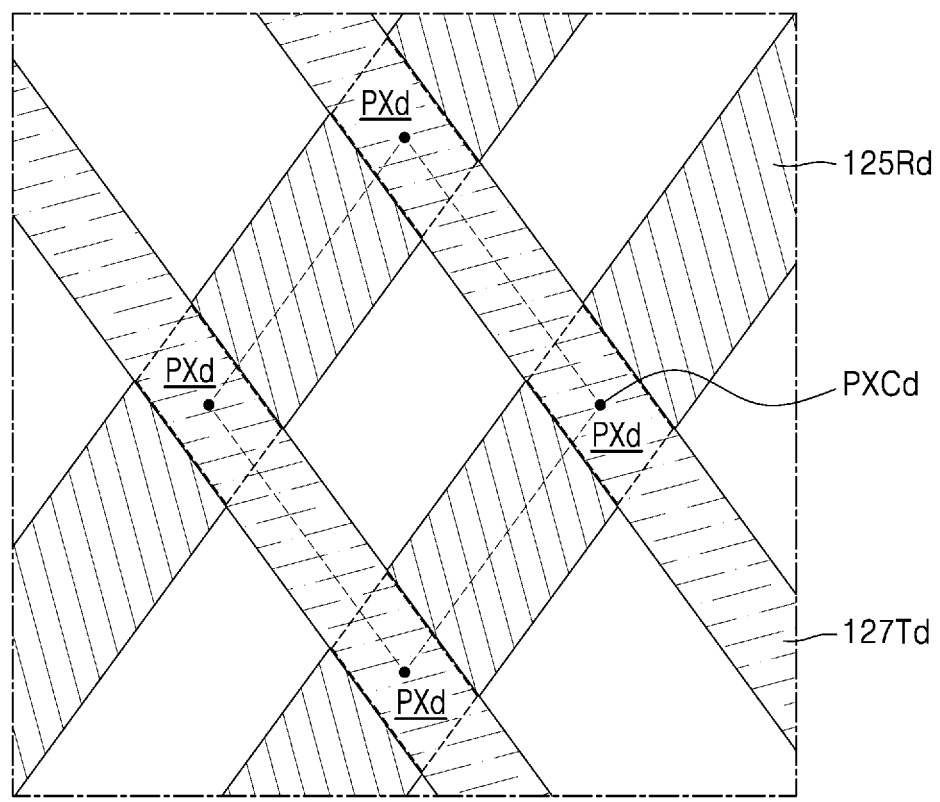

Referring to FIG. 3D, unlike in FIG. 2D, first sensing patterns 125Rd and second sensing patterns 127Td may each extend in a direction oblique with respect to each of the X and Y directions. According to an exemplary embodiment of the present inventive concept, centers PXCd of pixels PXd may be disposed at vertices of a rhombus. According to an exemplary embodiment of the present inventive concept, the centers PXCd of the four pixels PXd, formed by two neighboring first sensing patterns 125Rd and two neighboring second sensing patterns 127Td, may be vertices of a diamond shape.

Figure 4:
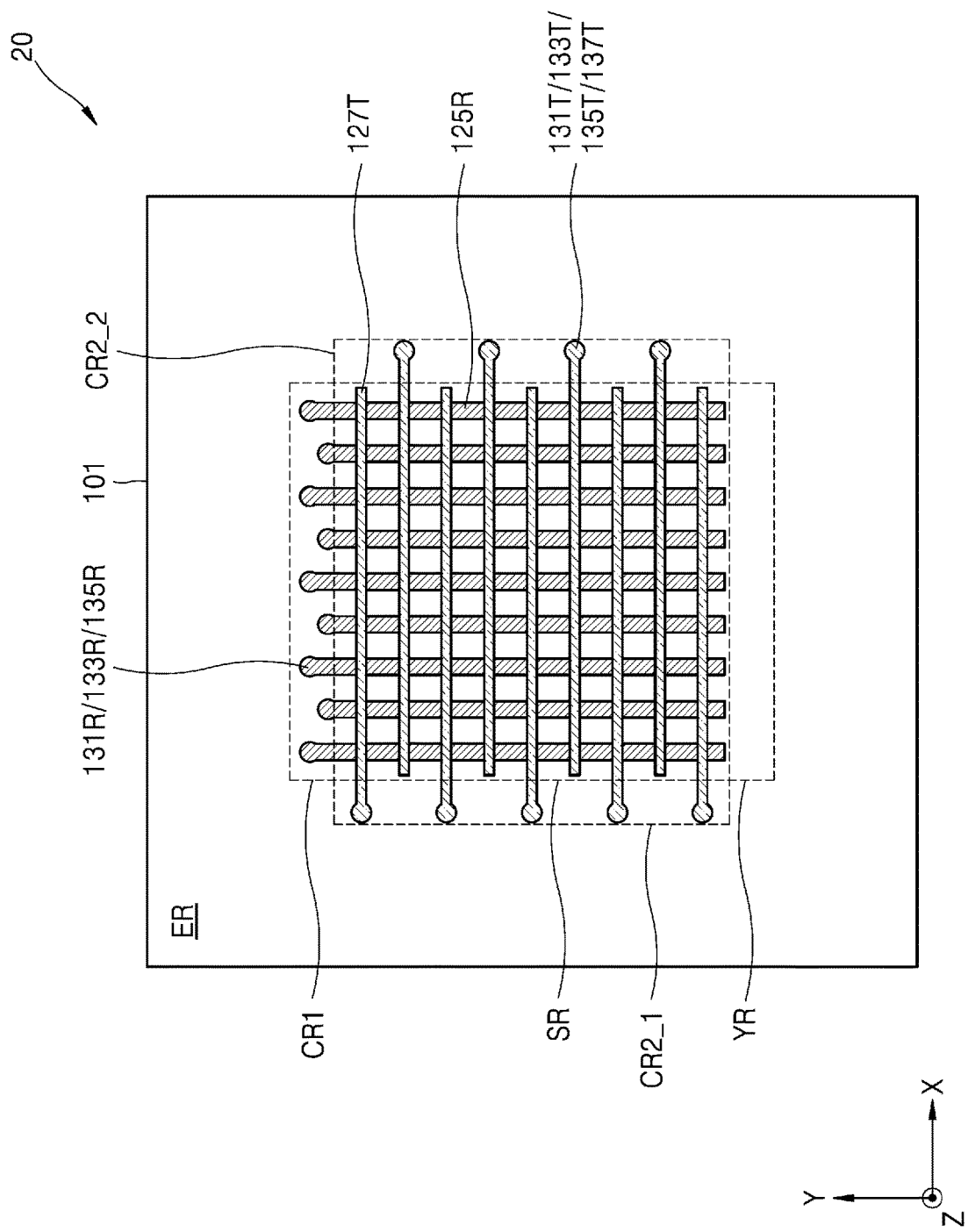
FIG. 4 is a plan view illustrating a fingerprint sensor package according to an exemplary embodiment of the present inventive concept.

FIG. 4 is a plan view illustrating a fingerprint sensor package 20 according to an exemplary embodiment of the present inventive concept.

For convenience of description, descriptions previously given with reference to FIGS. 2A to 2D are omitted, and differences therebetween are mainly described.

The fingerprint sensor package 20 may include a package substrate 101, the controller IC 210 (see FIG. 2B), the passive device 220 (see FIG. 2B), the mold 230 (see FIG. 2B), and the sensing part coating layer 300 (FIG. 2B).

Referring to FIG. 4, unlike the package substrate 100 of FIG. 2A, the package substrate 101 may provide the sensing region SR, the first contact region CR1, the second contact regions CR2_1 and CR2_2, the wiring region YR, and the edge region ER.

The first contact region CR1 may be formed at one end of the sensing region SR in the Y direction, and the wiring region YR may be formed at the other end of the sensing region SR, opposite to the first contact region CR1. The second contact region CR2_1 may be formed at one end in the X direction of the sensing region SR, and the second contact region CR2.2 may be formed at the other end of the sensing region SR, opposite to that of the second contact region CR2_1.

The first to third conductive vias 131R, 133R, and 135R in the first contact region CR1 may be staggered in the zigzag or alternating arrangement in the X direction. The first to fourth conductive vias 131T, 133T, 135T, and 137T in the second contact region CR2.1 and the first to fourth conductive vias 131T, 133T, 135T, and 137T in the second contact region CR2_2 may be arranged in a line in the Y direction.

Figure 5A:
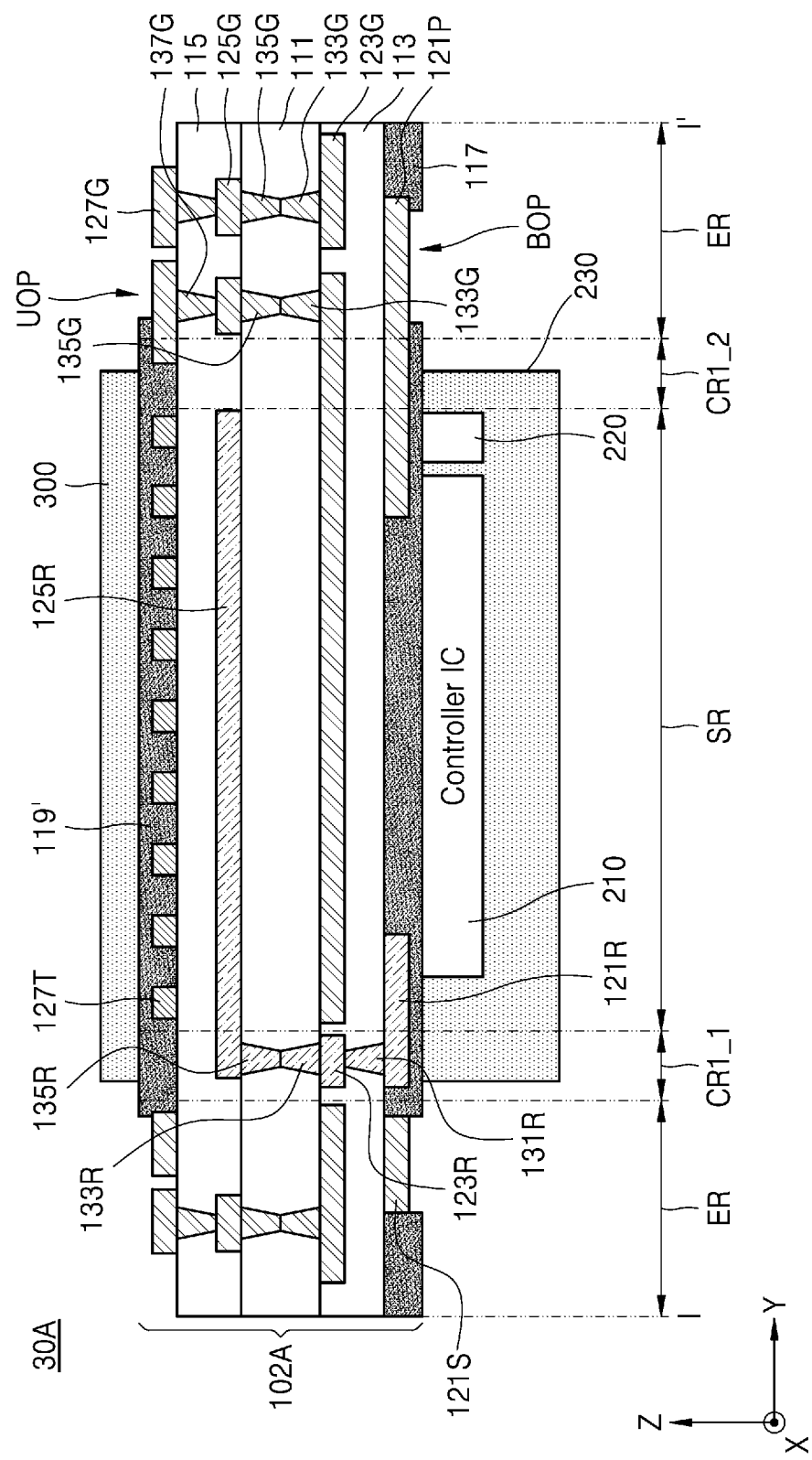
FIGS. 5A, 5B, 5C, 6, 7, 8A, 8B, and 9 are cross-sectional views illustrating fingerprint sensor packages according to an exemplary embodiment of the present inventive concept.
Figure 5B:
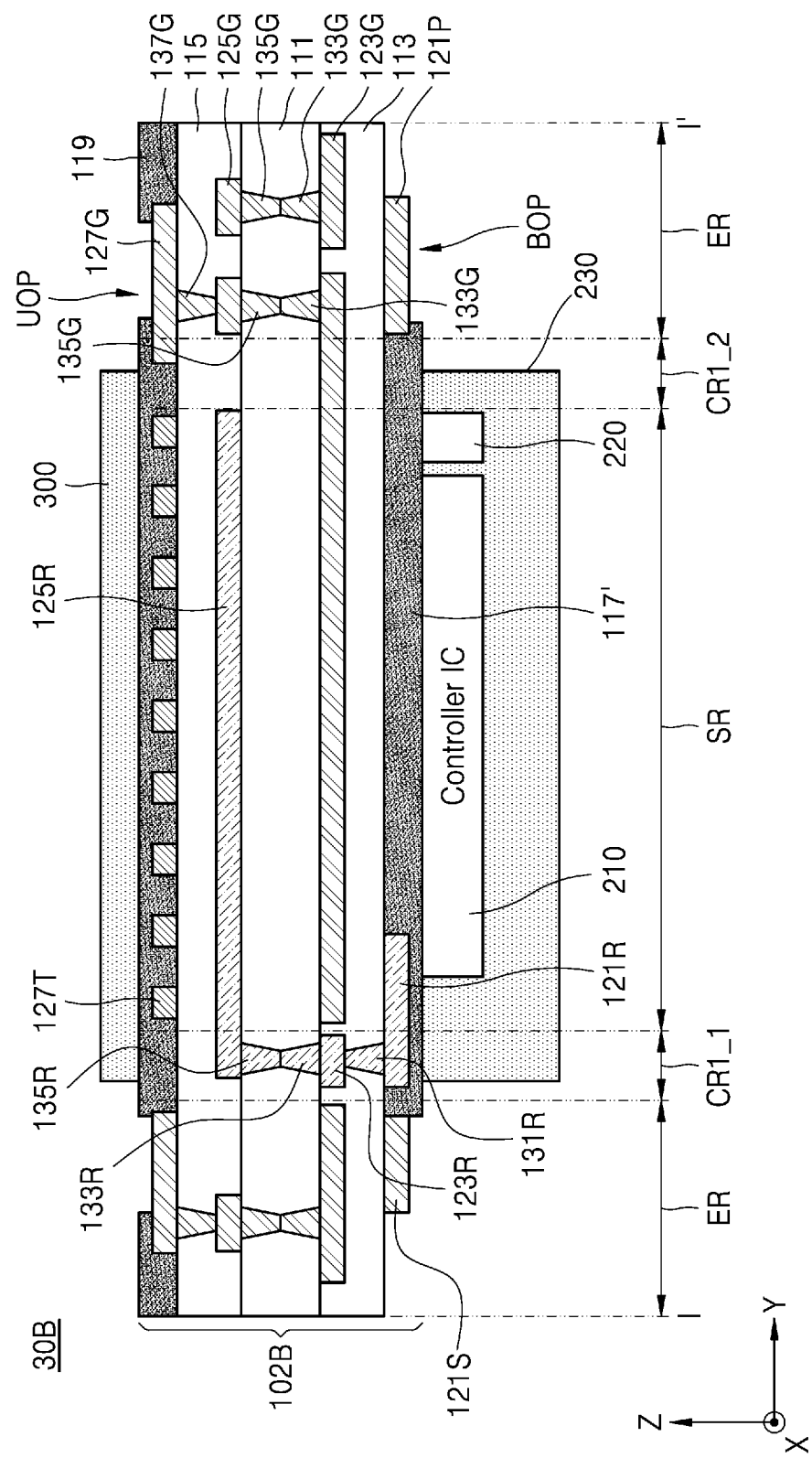
Figure 5C:
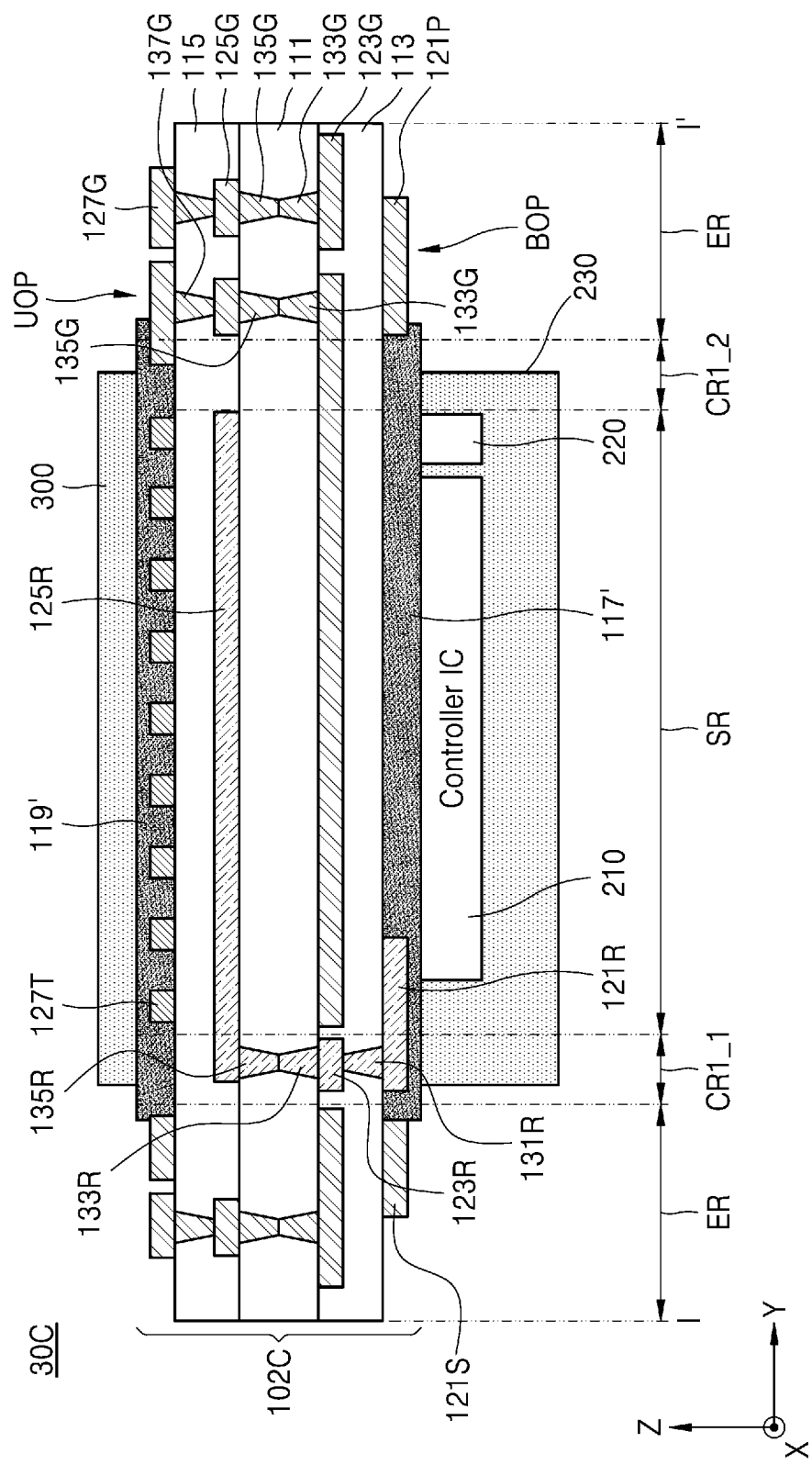
Figure 6:
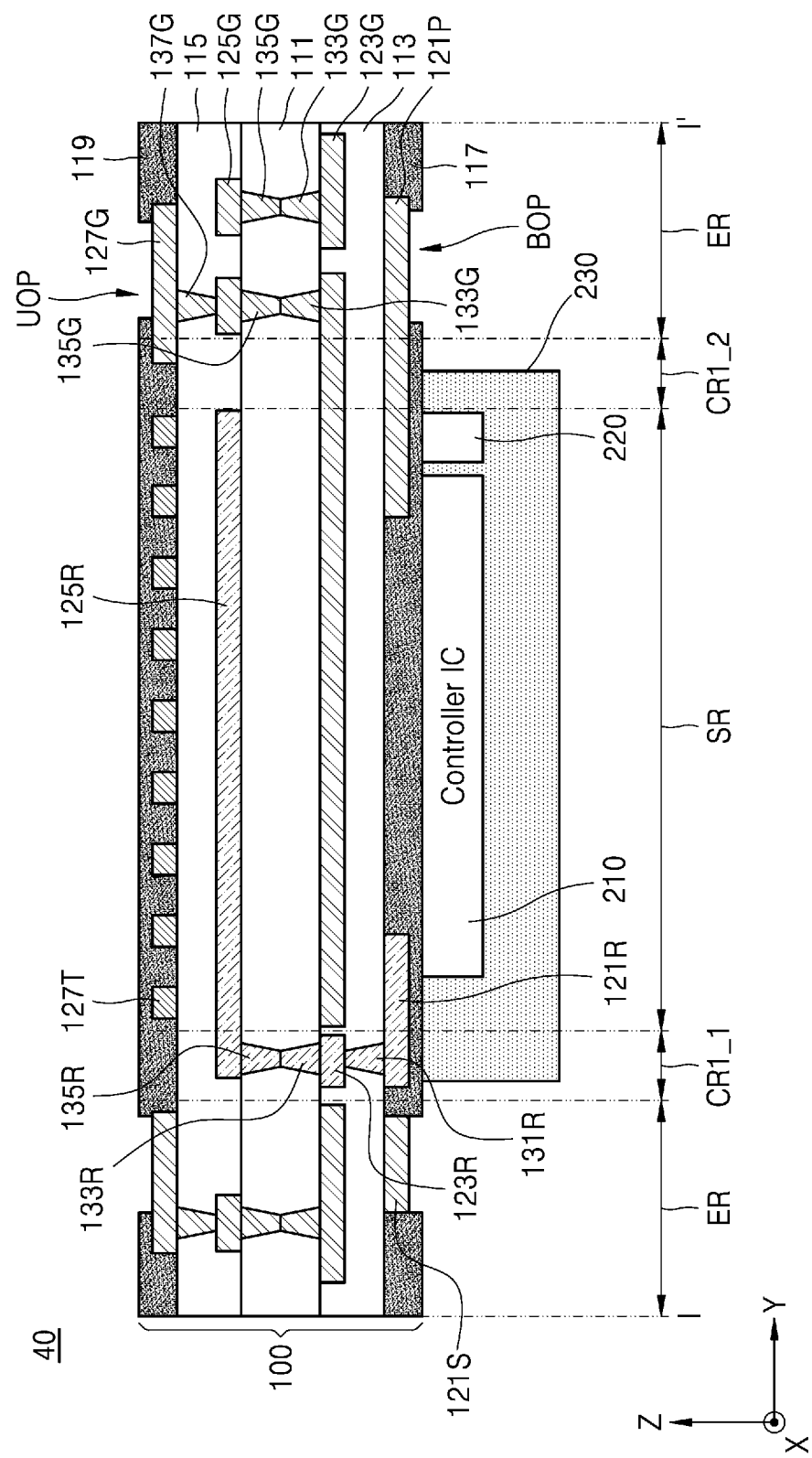
Figure 7:
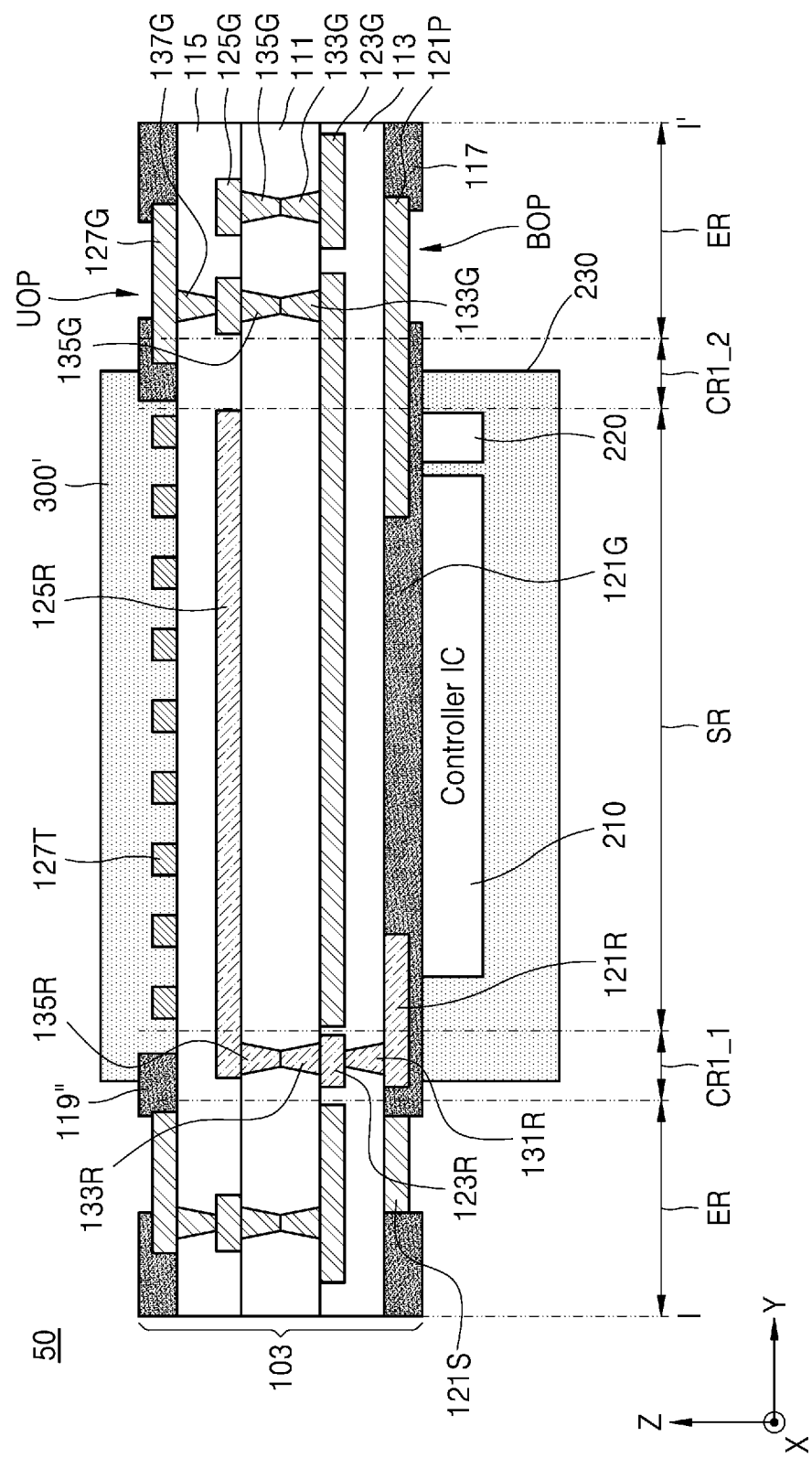

FIGS. 5A to 7 are cross-sectional views illustrating fingerprint sensor packages 30A, 30B, 30C, 40 and 50 according to some embodiments. FIGS. 5 to 7 are cross-sectional views of portions corresponding to FIG. 2B, respectively.

Referring to FIG. 5A, a fingerprint sensor package 30A may include a package substrate 102A, the controller IC 210, the passive device 220, the mold 230, and the sensing part coating layer 300.

The package substrate 102A of FIG. 5 is similar to the package substrate 100 of FIGS. 2A to 2D, but may include an upper protective layer 119' including an upper opening UOP that exposes the ground patterns 127G and the upper insulating layer 115. Accordingly, the upper opening UOP may extend to an end of the package substrate 102A in a horizontal direction (e.g., in the X direction and/or the Y direction). A portion of the ground patterns 127G and the upper insulating layer 115, which are exposed, may be covered by at least any one of a connection terminal, an insulating layer, and an adhesive layer when assembling the fingerprint sensor package 30A into an application such as the smart card 1 (see FIG. 1).

Referring to FIG. 5B, a fingerprint sensor package 30B may include a package substrate 102B, the controller IC 210, the passive device 220, the mold 230, and the sensing part coating layer 300.

The package substrate 102B of FIG. 5B is similar to the package substrate 100 of FIGS. 2A to 2D, but may include an upper protective layer 117' including the bottom opening BOP that exposes signal patterns 121S, power patterns 121P, ground patterns 121G, and a lower insulating layer 113. The bottom opening BOP may extend to an end of the package substrate 102B in the horizontal direction (e.g., in the X direction and/or the Y direction). At least some of the ground patterns 121G, at least some of the power patterns 121P, at least some of the signal patterns 121S, and the lower insulating layer 113, which are exposed, may be covered by at least any one of the connection terminal, the insulating layer, and the adhesive layer when assembling the fingerprint sensor package 30B into an application such as the smart card 1 (see FIG. 1).

Referring to FIG. 5C, a fingerprint sensor package 30C may include a package substrate 102C, the controller IC 210, the passive device 220, the mold 230, and the sensing part coating layer 300.

The package substrate 120C of FIG. 5C is similar to the package substrate 100 of FIGS. 2A to 2D, but the package substrate 120C may include the lower protective layer 117' and the upper protective layer 119'. The lower protective layer 117' may include the bottom opening BOP that exposes the signal patterns 121S, the ground patterns 121G, the power pattern 121P, and the lower insulating layer 113. The upper protective layer 119' may include the upper opening UOP that exposes a portion of the ground patterns 127G and the upper insulating layer 115.

Referring to FIG. 6, a fingerprint sensor package 40 may include the package substrate 100, the controller IC 210, the passive device 220, and the mold 230. The fingerprint sensor package 40 of FIG. 6 is similar to the fingerprint sensor package 10 of FIGS. 2A to 2D, but the fingerprint sensor package 40 may not include a coating layer to be disposed on the upper protective layer 119. For example, the upper protective layer 119 may be exposed.

Referring to FIG. 7, the fingerprint sensor package 50 may include a package substrate 103, the controller IC 210, the passive device 220, the mold 230, and a sensing part coating layer 300'.

The package substrate 103 of FIG. 7 is similar to the package substrate 100 of FIGS. 2A to 2D, but the package substrate 103 may include an upper protective layer 119" that exposes at least a portion of the second sensing patterns 127T on the sensing region SR. Accordingly, the sensing part coating layer 300' may overlap the second sensing patterns 127T. For example, the sensing part coating layer 300' may be in contact with the second sensing patterns 127T.

Figure 8A:
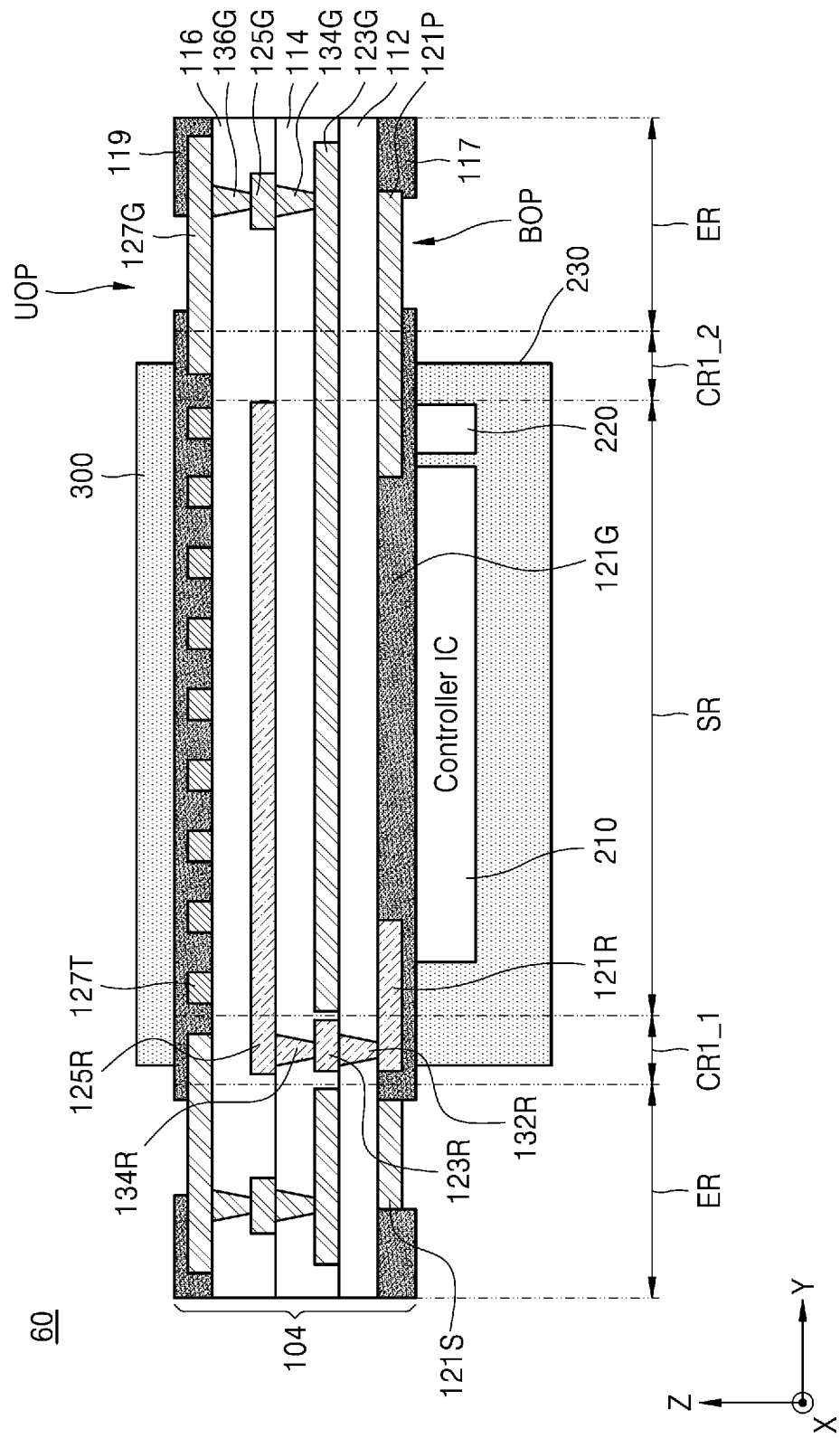
Figure 8B:
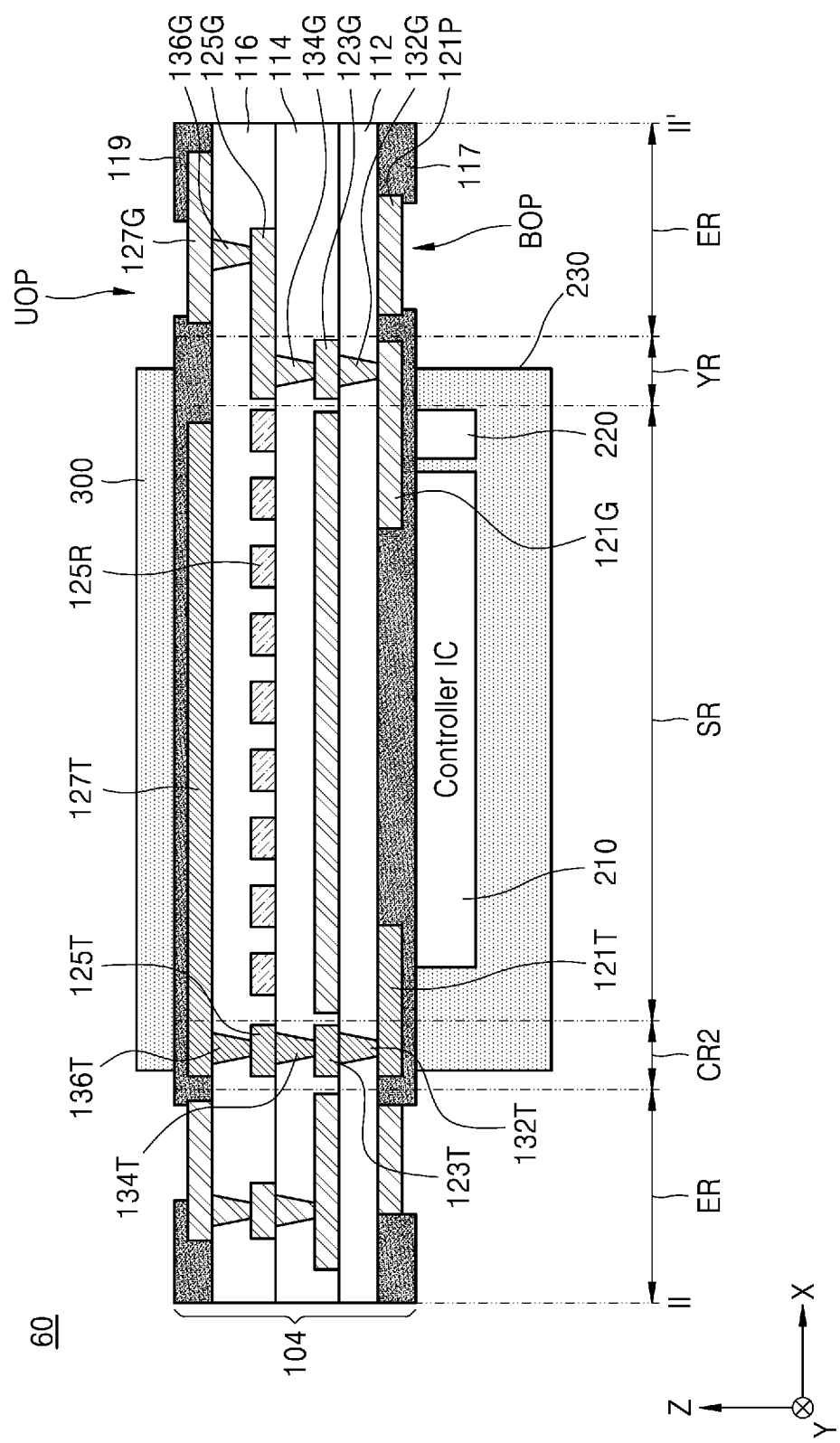

FIGS. 8A and 8B are cross-sectional views each illustrating a fingerprint sensor package 60 according to an exemplary embodiment of the present inventive concept. FIG. 8A is a cross-sectional view of a portion corresponding to FIG. 2B, and FIG. 8B is a cross-sectional view of a portion corresponding to FIG. 2C.

Referring to FIGS. 8A and 8B, the fingerprint sensor package 60 may include a package substrate 104, the controller IC 210, the passive device 220, the mold 230, and the sensing part coating layer 300.

According to an exemplary embodiment of the present inventive concept, the package substrate 104 may not include a base layer. According to an exemplary embodiment of the present inventive concept, the package substrate 104 may include first to third insulating layers 112, 114, and 116 constituting a redistribution layer. The package substrate 104 may further include the lower protective layer 117, the upper protective layer 119, the first conductive patterns 121G, 121P, 121R, 121S, and 121T, the second conductive patterns 123G, 123R, and 123T, the third conductive patterns 125G, 125R, and 125T, and the fourth conductive patterns 127G and 127T. The package substrate 104 may further include the first conductive vias 132G, 132R, and 132T having the tapered structure, the second conductive vias 134G, 134R, and 134T, and the third conductive vias 136G, 136R, and 136T. For example, the first conductive vias 132G, 132R, and 132T may have a tapered structure toward the protective layer 117.

The first insulating layer 112 may be disposed on the lower protective layer 117 and the first conductive patterns 121G, 121P, 121R, 121S, and 121T. The first conductive vias 132G, 132R, and 132T may penetrate the first insulating layer 112 and may contact the first conductive patterns 121G, 121R, and 121T.

The second conductive patterns 123G, 123R, and 123T and the second insulating layer 114 may be disposed on the first insulating layer 112. The second conductive patterns 123G, 123R, and 123T may be covered by the second insulating layer 114. The second conductive vias 134G, 134R, and 134T may penetrate at least a portion of the second insulating layer 114 and may contact the second conductive patterns 123G, 123R, and 123T.

The third conductive patterns 125G, 125R, and 125T and the third insulating layer 116 may be disposed on the second insulating layer 114. The third conductive patterns 125G, 125R, and 125T may be covered by the third insulating layer 116. The third conductive vias 136G and 136T may penetrate at least a portion of the third insulating layer 116 and may contact the third conductive patterns 125G and 125T.

The fourth conductive patterns 125G and 125T and the upper protective layer 119 may be disposed on the third insulating layer 116. The fourth conductive patterns 125G and 125I may be at least partially covered by the upper protective layer 119. The fourth conductive patterns 125G and 125T may contact the third conductive vias 136G and 136T.

Figure 9:
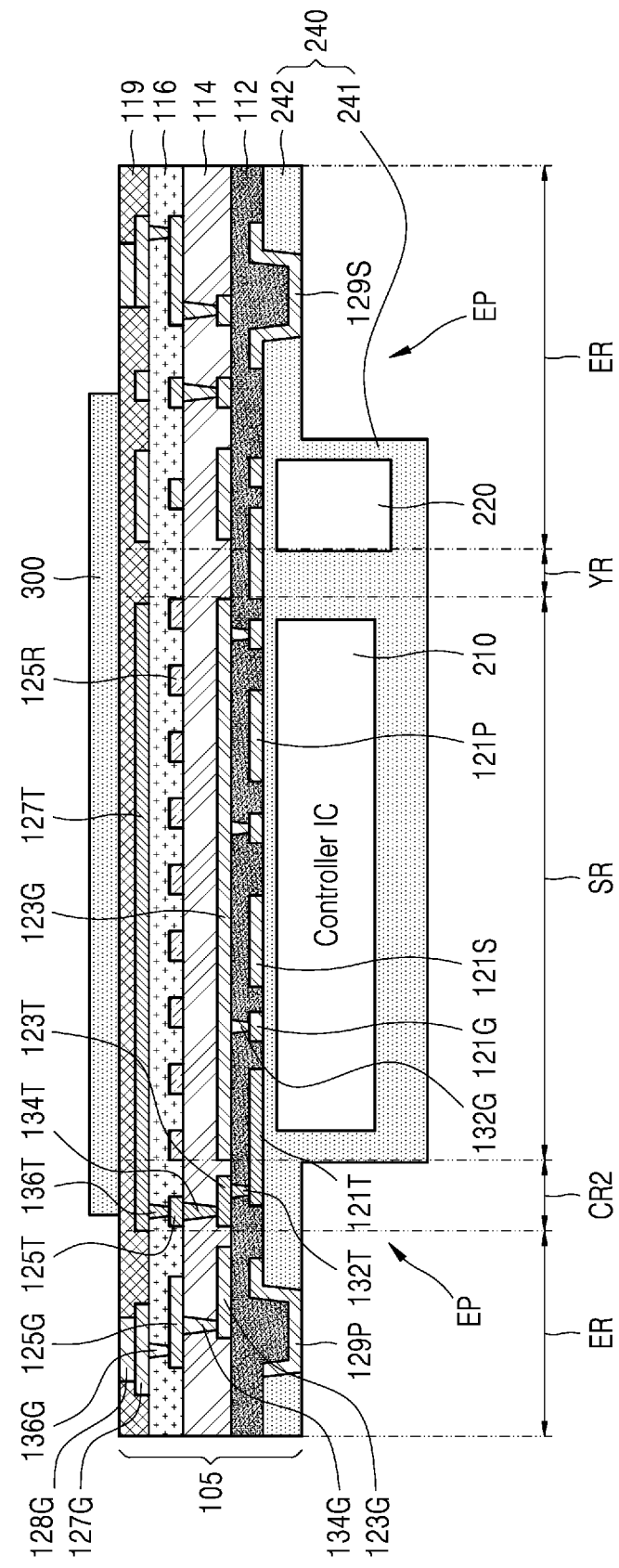

FIG. 9 is a cross-sectional view illustrating a fingerprint sensor package 70 according to an exemplary embodiment of the present inventive concept. For example, FIG. 9 is a cross-sectional view of a portion corresponding to FIG. 2C.

Referring to FIG. 9, the fingerprint sensor package 70 may include a fan-out wafer level package. The fingerprint sensor package 70 may include a package substrate 105, the controller IC 210, the passive device 220, the mold 240, and the sensing part coating layer 300.

According to an exemplary embodiment of the present inventive concept, the package substrate 105 may not include a base layer, similar to the package substrate 104 of FIGS. 8A and 8B. The package substrate 105 may include the first to third insulating layers 112, 114 and 116, and a wiring structure within the first to third insulating layers 112, 114 and 116. The wiring structure may further include the first conductive patterns 121G, 121P, 121S, and 121T, the second conductive patterns 123G and 123T, the third conductive patterns 125G, 125R, and 125T, the fourth conductive patterns 127G and 127T, fifth conductive patterns 128G, sixth conductive patterns 129P, and the first conductive vias 132G and 132T, the second conductive vias 134G and 134T, and the third conductive vias 136G and 136T, having the tapered structure. For example, the first conductive vias 132G and 132T, the second conductive vias 134G and 134T, and the third conductive vias 136G and 136T may each have a tapered structure toward the mold 240. According to an exemplary embodiment of the present inventive concept, the wiring structure within the package substrate 105 may be formed by a dual damascene process.

According to an exemplary embodiment of the present inventive concept, the package substrate 105 may be similar to the package substrate 104 of FIGS. 8A and 8B, but may not include the lower protective layer. The package substrate 105 may include the fifth conductive patterns 1280 and the sixth conductive patterns 129P and 129S. The fifth conductive patterns 128G may be formed on an upper portion of the package substrate 104, and the sixth conductive patterns 129P and 129S may be formed on a lower portion of the package substrate 105. The fifth conductive patterns 128G may receive the reference potential from the outside. The sixth conductive patterns 129P and 129S may include the power pattern 129P and the signal pattern 129S. The power pattern 129P may receive the power from the outside, and the signal pattern 129S may transmit the signal to the outside. The sixth conductive patterns 129P and 129S may include an additional pattern for receiving the reference potential from the outside.

According to an exemplary embodiment of the present inventive concept, the mold 240 may include a stepped structure formed by partially removing a flat mold layer. Such a stepped structure may be formed by, for example, a mechanical method, but the present inventive concept is not limited thereto. For example, the mold 240 may include an uneven surface, for example, the lower or upper surface. The mold 240 may include a first portion 241 and a second portion 245. The first portion 241 of the mold 240 may protect the controller IC 210 and the passive device 220, and the second portion 245 at least partially surrounds the first portion 241. For example, the second portion 242 of the mold 240 may be wider than the first portion 241 of the mold 240. According to an exemplary embodiment of the present inventive concept, a thickness of the first portion 241 (e.g., a length in the Z direction) may be greater than or equal to the thickness of the second portion 242 (e.g., the length in the Z direction); however, the present inventive concept is not limited thereto. The sixth conductive patterns 129P and 129S may be exposed through the second portion 245 of the mold 240.

The controller IC 210 and the passive device 220 may be connected to the first conductive patterns 121G. 121P, 121S, and 121T through an external connection terminal such as an under bump metallurgy (UBM).

Figure 10A:
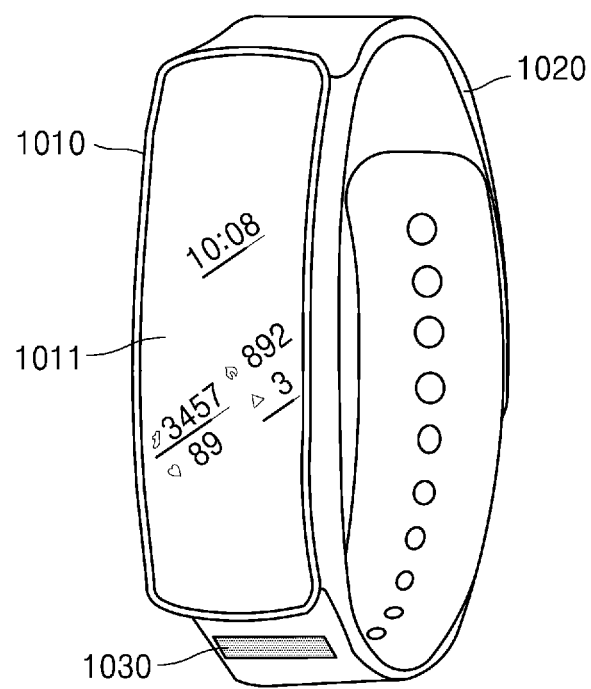
FIG. 10A is a perspective view illustrating a wearable device including a fingerprint sensor package according to an exemplary embodiment of the present inventive concept.

FIG. 10A is a perspective view illustrating a wearable device 1000 including a fingerprint sensor package 1030 according to an exemplary embodiment of the present inventive concept.

Figure 10B:
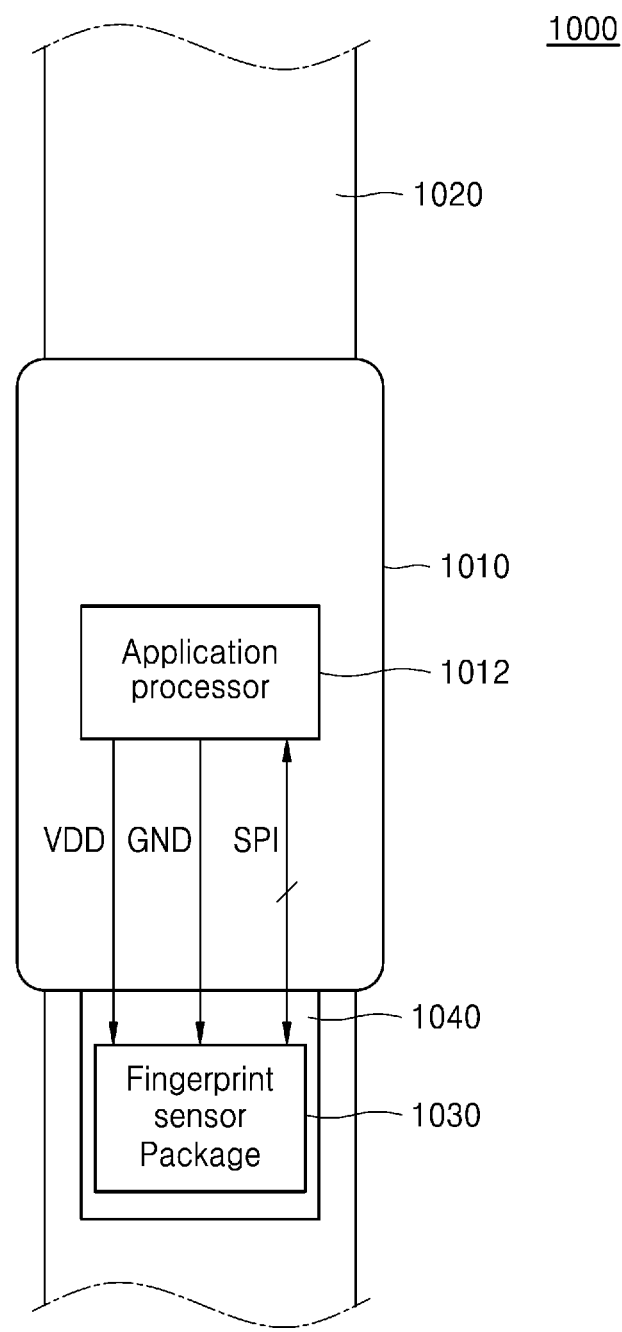
FIG. 10B is a block diagram illustrating the wearable device of FIG. 10A.

FIG. 10B is a block diagram illustrating the wearable device 1000 of FIG. 10A.

Referring to FIGS. 10A and 10B, the wearable device 1000 may be an electronic device that is worn on a human body such as an arm or a head, and is fixed to a specific structure by a strap 1020.

In FIG. 10A, an example in which the wearable device 1000 is a wrist watch-type wearable device will be described.

According to an exemplary embodiment of the present inventive concept, the wearable device 1000 according to an exemplary embodiment of the present inventive concept may include a main body 1010, the strap 1020, and the fingerprint sensor package 1030. The main body 1010 includes a display device 1011 and an application processor (AP) 1012. The display device 1011 is configured to output an image.

As shown in FIG. 10A, for example, when the strap 1020 is formed of two pieces, a plurality of straps may be respectively connected to two opposing ends of the main body 1010. In addition, for example, when the strap 1020 is formed as an integral type, it may have a shape surrounding the main body 1010.

The fingerprint sensor package 1030 may include any one of the fingerprint sensor packages 10, 20, 30A, 30B, 30C, 40, 50, and 60 described with reference to FIGS. 2A to 2D and 4 to 8B. The fingerprint sensor package 1030 may detect the user's fingerprint to release a sleep mode of the wearable device 1000, turn power on/off, and provide a security function. In addition, the fingerprint sensor package 1030 may operate according to the method of capacitance, and thus, the fingerprint sensor package 1030 may include a capacitance sensing circuit for detecting the change in capacitance generated from an electrode, an analog-digital conversion circuit that converts an output signal of the capacitance sensing circuit into a digital value, and an operation circuit that determines a touch input using data converted into a digital value.

Because the fingerprint sensor package 1030 may be implemented as a printed circuit board (PCB), the fingerprint sensor package 1030 may have a relatively high flexibility and may be easily mounted on the strap 1020. In addition, because the fingerprint sensor package 1030 may implement a wide sensing area compared to the manufacturing cost, a high recognition rate of a fingerprint may be provided through increased resolution.

In addition, the fingerprint sensor package 1030 may be connected to the AP 1012, which is included in the main body 1010, through a flexible printed circuit board (FPCB). Accordingly, the fingerprint sensor package 1030 may receive pieces of power VDD and GND from the AP 1012 and transmit an image of a detected fingerprint through a serial peripheral interface (SPI). The AP 1012 may be implemented by a combination of hardware such as a microcontroller and software installed thereon and programmed to perform a set operation.

Figure 11:
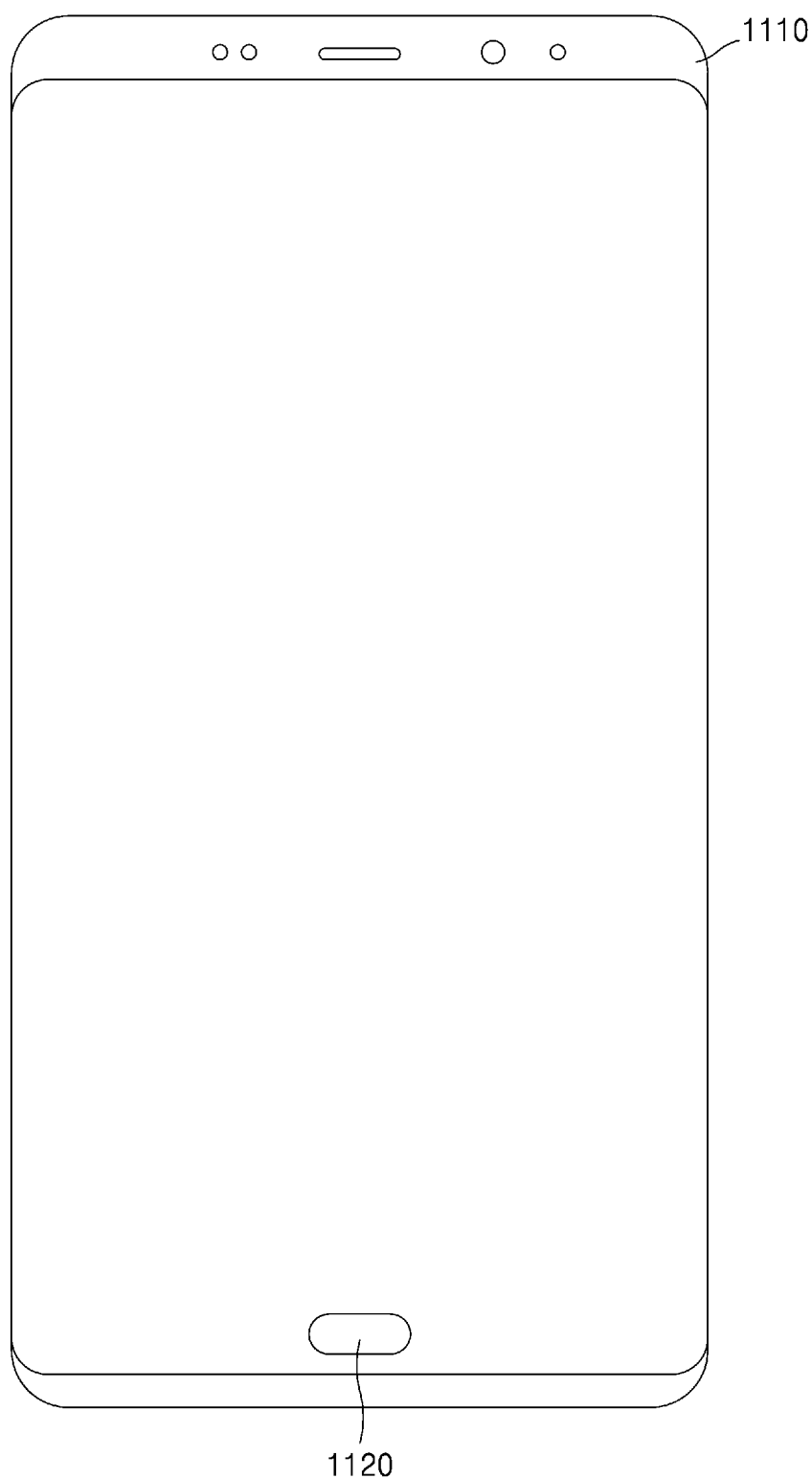
FIG. 11 is a plan view illustrating a mobile terminal including a fingerprint sensor package according to an exemplary embodiment of the present inventive concept.

FIG. 11 is a plan view illustrating a mobile terminal 1100 including a fingerprint sensor package 1120 according to an exemplary embodiment of the present inventive concept.

The mobile terminal 1100 may further include, for example, a display 1110 which is a touch screen device, a camera, a speaker, a temperature sensor, a motion sensor, and the like.

The fingerprint sensor package 1120 may include any one of the fingerprint sensor packages 10, 20, 30A, 30B, 30C, 40, 50, 60, and 70 described with reference to FIGS. 2A to 2D and 4 to 8B.

While the present inventive concept has been particularly shown and described with reference to exemplary embodiments thereof, it will be apparent to those of ordinary skill in the art that various changes in form and detail may be made thereto without departing from the spirit and scope of the present inventive concept.

What is claimed is:

1. A smart card comprising:
an integrated circuit (IC) chip storing information; and
a fingerprint sensor package sensing a user's fingerprint and transmitting a signal for a sensing result to the IC chip,
wherein the fingerprint sensor package comprises:
a plurality of first sensing patterns disposed in a sensing region of the fingerprint sensor package and extending in a first direction;
first ground patterns disposed in an edge region that at least partially surrounds the sensing region, wherein the first ground patterns are disposed at substantially the same level as the first sensing patterns, and applied with a reference potential;
a plurality of second sensing patterns disposed in the sensing region of the fingerprint sensor package and extending in a second direction crossing the first direction; and
second ground patterns disposed in the edge region, and at substantially the same level as the second sensing patterns, wherein the second ground patterns are connected to the first ground patterns,
wherein the first sensing patterns and the second sensing patterns are spaced apart from each other in a third direction substantially perpendicular to each of the first and second directions, and the first sensing patterns and the second sensing patterns constitute a plurality of capacitors.

2. The smart card of claim 1, wherein the fingerprint sensor package comprises:
a package substrate having a rectangular planar shape and comprising an upper insulating layer between the first and second sensing patterns and the first and second ground patterns; and
a controller IC mounted on the package substrate and configured to determine whether a sensed fingerprint matches a registered fingerprint.

3. The smart card of claim 2, wherein the first sensing patterns extend in a direction parallel to first edges of the rectangular planar shape of the package substrate, and
the second sensing patterns extend in a direction parallel to second edges of the rectangular planar shape that are substantially perpendicular to the first edges.

4. The smart card of claim 3, wherein the second sensing patterns are spaced farther apart from the controller IC in the third direction than the first sensing patterns, and the first sensing patterns extend in a direction oblique to the second edges of the rectangular planar shape.

5. The smart card of claim 3, wherein the second sensing patterns are spaced farther apart from the controller IC in the third direction than the first sensing patterns, and the second sensing patterns extend in a direction oblique to the first edges of the rectangular planar shape.

6. The smart card of claim 3, wherein each of the first and second sensing patterns extend in a direction oblique to the first and second edges of the rectangular planar shape.

7. The smart card of claim 2, wherein a first width of the first sensing patterns is greater than a second width of the second sensing patterns.

8. The smart card of claim 7, wherein the first width ranges from 40 μm to about 70 μm.

9. The smart card of claim 7, wherein the second width ranges from 5 μm to about 25 μm.

10. The smart card of claim 7, wherein the second width ranges from about 2 times to about 4 times the first width.

11. The smart card of claim 2, wherein the package substrate further comprises third ground patterns between the first sensing patterns and the controller IC, and applied with the reference potential, and
the first sensing patterns and the controller IC overlap each other.

12. The smart card of claim 11, wherein the package substrate further comprises:
power patterns between the third ground patterns and the controller IC, and applied with a power potential different from the reference potential;
a lower protective layer covering the power patterns; and
an upper protective layer covering the second ground patterns,
wherein the lower protective layer comprises a lower opening that exposes a portion of the power patterns, and the upper protective layer comprises an upper opening that exposes a portion of the second ground patterns.

13. A fingerprint sensor package comprising:
a package substrate; and
a controller integrated circuit (IC) mounted on the package substrate and configured to determine whether a registered fingerprint matches a sensed fingerprint, wherein the package substrate comprises:
a base layer;
an upper insulating layer disposed on a first surface of the base layer;
a lower insulating layer disposed on a second surface of the base layer;
an upper protective layer disposed on the upper insulating layer;
a lower protective layer disposed on the lower insulating layer;
first conductive patterns covered by the lower protective layer, and comprising first ground patterns, power patterns, signal patterns, first pads, and second pads;
second conductive patterns disposed on the lower insulating layer, and comprising second ground patterns, third pads, and fourth pads, wherein the second ground patterns are connected to the first ground patterns, wherein the third pads are connected to the first pads, and wherein the fourth pads are connected to the second pads;
third conductive patterns covered by the upper insulating layer, and comprising third ground patterns, first sensing patterns, and fifth pads, wherein the third ground patterns are connected to the second ground patterns, wherein the first sensing patterns are connected to the third pads and extending in a first direction parallel to an upper surface of the package substrate, and wherein fifth pads are connected to the fourth pads; and
fourth conductive patterns covered by the upper protective layer, and comprising fourth ground patterns and second sensing patterns, wherein the fourth ground patterns are connected to the third ground patterns, wherein the second sensing patterns are connected to the fifth pads, and wherein the fourth conductive patterns extends in a second direction that crosses the first direction and is substantially parallel to the upper surface of the package substrate,
wherein a sensing region and an edge region surrounding the sensing region are provided on the package substrate,
wherein the first and second sensing patterns are disposed in the sensing region,
the upper protective layer comprises upper openings that expose a portion of the fourth ground patterns, and
the lower protective layer comprises lower openings that expose portions of each of the first ground patterns, the power patterns, and the signal patterns.

14. The fingerprint sensor package of claim 13, further comprising:
first conductive vias connected to each of the first conductive patterns and the second conductive patterns;
second conductive vias connected to the second conductive patterns;
third conductive vias connected to each of the second conductive vias and the third conductive patterns; and
fourth conductive vias connected to each of the third conductive patterns and the fourth conductive patterns,
wherein the first to fourth conductive vias are tapered toward a central portion of the base layer.

15. The fingerprint sensor package of claim 14, wherein the second ground patterns are disposed in the sensing region and overlap the first and second sensing patterns.

16. The fingerprint sensor package of claim 13, wherein the third ground patterns surround the first sensing patterns, and
the fourth ground patterns surround the second sensing patterns.

17. A fingerprint sensor package comprising:
a package substrate; and
a controller integrated circuit (IC) mounted on the package substrate and configured to determine whether a registered fingerprint matches a sensed fingerprint,
wherein the package substrate comprises:
first conductive patterns comprising first ground patterns, power patterns, signal patterns, first pads, and second pads, wherein the first ground patterns receive a reference potential, wherein the power patterns receive a power potential, wherein the signal patterns are configured to output a signal of the controller IC, and wherein the first conductive patterns are connected to the controller IC;
second conductive patterns comprising second ground patterns, third pads, and fourth pads, wherein the second ground patterns are connected to the first ground patterns, wherein the third pads are connected to the first pads, wherein the fourth pads are connected to the second pads, and wherein the second conductive patterns are disposed on the first conductive patterns;
third conductive patterns comprising third ground patterns, first sensing patterns, fifth pads, wherein the third ground patterns are connected to the second ground patterns, wherein the first sensing patterns have a line shape extending in a first direction parallel to an upper surface of the package substrate and are connected to the third pads, wherein the fifth pads are connected to the fourth pads, and wherein the third conductive patterns are disposed on the second conductive patterns; and
fourth conductive patterns comprising fourth ground patterns and second sensing patterns, wherein the fourth ground patterns are connected to the third ground patterns, and wherein the second sensing patterns have a line shape extending in a second direction, which is parallel to the upper surface of the package substrate and crosses the first direction, and are connected to the fifth pads, and wherein the fourth conductive patterns are disposed on the third conductive patterns,
wherein a sensing region and an edge region surrounding the sensing region are provided on the package substrate,
wherein the first and second sensing patterns are disposed in the sensing region, and
wherein the third and fourth ground patterns are disposed in the edge region.

18. The fingerprint sensor package of claim 17, wherein the package substrate further comprises:
a lower protective layer disposed between the controller IC and the first conductive patterns and covering the first conductive patterns; and
an upper protective layer disposed on the fourth conductive patterns and covering the fourth conductive patterns,
wherein the lower protective layer comprises first openings that partially expose the first ground patterns, the power patterns, and the signal patterns, and
the lower protective layer comprises second openings that partially expose the fourth ground patterns.

19. The fingerprint sensor package of claim 17, further comprising:
first conductive vias contacting the first and second conductive patterns;
second conductive vias contacting the second and third conductive patterns; and third conductive vias contacting the third and fourth conductive patterns, wherein the first to third conductive vias each have a tapered shape toward the controller IC.

20. The fingerprint sensor package of claim 17, further comprising an insulating layer between the first sensing patterns and the second sensing patterns, wherein the controller IC compares a user's fingerprint with a registered fingerprint based on a change in capacitance between the first sensing patterns and the second sensing patterns.

* * * * *